United States Patent [19]
Aoki et al.

[11] Patent Number: 5,111,299
[45] Date of Patent: May 5, 1992

[54] STILL VIDEO CAMERA

[75] Inventors: Harumi Aoki; Tahei Morisawa; Kimiaki Ogawa; Makoto Mogamiya, all of Tokyo, Japan

[73] Assignee: Asahi Kogaku Kogyo Kabushiki Kaisha, Tokyo, Japan

[21] Appl. No.: 417,055

[22] Filed: Oct. 4, 1989

[30] Foreign Application Priority Data

| Oct. 4, 1988 | [JP] | Japan | 63-250266 |
| Oct. 4, 1988 | [JP] | Japan | 63-250267 |
| Oct. 4, 1988 | [JP] | Japan | 63-250268 |
| Oct. 4, 1988 | [JP] | Japan | 63-250269 |
| Oct. 4, 1988 | [JP] | Japan | 63-250270 |

[51] Int. Cl.$^5$ .................... H04N 5/30; H04N 5/225
[52] U.S. Cl. .................... 358/209; 358/909; 358/335
[58] Field of Search .................... 358/213.19, 209, 906, 358/909, 335, 224; 354/289.1, 202

[56] References Cited

U.S. PATENT DOCUMENTS

| 4,651,216 | 3/1987 | Arai et al. | 358/228 |
| 4,695,905 | 9/1987 | Utsugi | 360/33.1 |
| 4,739,394 | 4/1988 | Oda et al. | 358/29 |
| 4,739,417 | 4/1988 | Ogawa | 358/310 |
| 4,740,828 | 4/1988 | Kinoshita | 358/48 |
| 4,746,993 | 5/1988 | Tada | 358/335 |
| 4,782,355 | 11/1988 | Sakai et al. | 354/400 |
| 4,805,010 | 2/1989 | Shroyer et al. | 358/29 |
| 4,858,028 | 8/1989 | Okino | 358/335 |
| 4,862,294 | 8/1989 | Mihara et al. | 360/35.1 |

FOREIGN PATENT DOCUMENTS 2156534 10/1985 United Kingdom.

OTHER PUBLICATIONS

Copy of U.K. Search Report.

Primary Examiner—James J. Groody
Assistant Examiner—Safet Metjahic
Attorney, Agent, or Firm—Sandler, Greenblum & Bernstein

[57] ABSTRACT

A mode changing device for a camera employing a minimum number of actuating members to permit a user to change an operating mode and/or setting of the camera. A mode actuating member and a selector switch, used in conjunction with an LCD panel that indicates the mode and setting that has been selected by the user, permits the user to easily select and/or adjust the features of the cameras, such as a photographing mode, a playback mode, an exposure mode, a white balance mode, a copy/monitor mode and a time/date mode. When the mode changing device is applied to a still video camera having a playback function, a changeover switch automatically changes the operating mode of the camera from a record mode to a playback mode when a monitoring adapter is connected to the camera, further reducing the number of actuating members that are needed to control the camera. In addition, the camera is designed to minimize the waste of electrical power by inhibiting the operation playback mode until the camera is instructed to begin operating.

38 Claims, 15 Drawing Sheets

⚡AUTOONOFF

⚡AUTOONOFF

⚡AUTOONOFF

STILL VIDEO CAMERA

BACKGROUND OF THE INVENTION

1. Field of the Invention

The present invention relates to a photographic camera and, more particularly, to a still camera that is provided with at least one mode changing device, a time/date device or an exposure compensating device which can be used with the still video camera that is provided with a playback device or an audio recording/playback device.

2. Description of Background Information

Recently, multifunction type cameras, in which each function includes a plurality of changeable modes and a plurality of changeable settings have become popular. For example, still video cameras having the capability of operating in a SINGLE mode (to take one photograph at a time), a RUNNING (CONTINUOUS) mode (for taking a series of rapid sequence photographs) and a SELF-TIMER mode. In addition, such a camera usually includes a white balance function having an AUTO, CLOUDY, FINE, FLUORESCENT and IN-CANDESCENT setting mode; a recording function, including an IMAGE (PICTURE) RECORD mode and an AUDIO (VOICE) RECORD mode; a playback function for playing back a recorded audio or image signal; and a time/date function for displaying or recording the date and time.

Changing any of these modes has usually been carried out by actuating a plurality of switches located on the body of the camera. In this respect, a plurality of actuating members have been required to change the modes and functions of the camera. Thus, the number of actuating members on a camera have increased as the number of functions or modes have increased. In addition, various combinations of several actuating members have also been employed to effect changes to the modes and functions of the camera.

However, the large number of actuating members has created a problem, in that users cannot understand or remember which actuating member should be operated to achieve a desired result. Consequently, a desired picture can be missed or poor recording can result.

Still video cameras have also been developed that include the ability to record the date, time, and other type of information, with the photographic recording. Such prior art cameras include display means for such a date/time "stamping" function which is independent of the display means for the other camera functions, such as the abovementioned PHOTOGRAPHING mode. These cameras employ additional actuating members for specifically switching between the date display and the time display and for adjusting the date or time. The increased number of actuating members found on these cameras are a serious burden to the photographer which needs to be overcome in order to improve the operability and compactness of the camera.

Photographic cameras have also been developed which include an automatic exposure means that has an exposure compensating device to allow an exposure value to be manually compensated. The expression "automatic exposure means", as used herein, should be understood to designate a camera component which measures the light intensity of an object to be photographed, calculates an exposure value from the measured value (brightness of the object to be photographed) and then sets an F-stop value and a shutter speed or, in the case of a still video camera, sets a charging time of a pick-up element on the basis of the exposure value so as to effect an exposure on the basis of the value thus set up.

Prior art exposure compensating devices can be classified as one of two types. The first type has a fixed exposure compensation value. The second type has an adjustable exposure compensation value which can be changed by the user. A camera employing the fixed exposure compensation value is convenient to operate, in that only a single actuating switch is needed. However, such a camera is inflexible in that it cannot be adapted to different light intensities in a photographic scene and it cannot obtain an optimum exposure to meet the requirements of certain photographic situations. The variable exposure compensation value type camera permits a photographer to change the exposure setting by operating an exposure adjusting switch. However, such a camera has a complicated procedure for changing and canceling exposure compensation values. Furthermore, providing an additional switch, exclusively for changing the compensation value, increases the total number of switches, reducing the operability and compactness of the camera.

Still video cameras have also been developed that can record and playback a video image or audio signal. In such a still video camera, an operator switches between the record mode and the playback mode by operating an externally operated switch. Accordingly, it has been necessary to add an additional switch to the camera body which is manipulated by the operator to manually switch between the record mode and the playback mode. This manual switching operation has further complicated the operating convenience of such a camera.

In addition, still video cameras which are capable of recording and playing back an image onto a recording medium, such as a magnetic disk, typically employ a spindle motor which is used to rotate the magnetic disk upon the selection of the playback mode so as to activate a magnetic head which is used to reproduce the information on the recording medium. However, such an arrangement forces the user to manually switch the mode of the camera from the record mode to the playback mode.

If the above-mentioned manual operation is omitted, the spindle motor will continue to rotate as long as the camera remains in the playback mode, even if the recorded information is not being viewed. Thus, the battery that powers the camera will be consumed, reducing the operating time of the camera. However, providing an additional switch for the exclusive purpose for controlling the start/stop operation, when the camera is in the playback mode, would increase the bulkiness of the camera.

Prior art cameras have also been developed which are adapted to output the recorded signals to an external apparatus when the camera is in the record mode for the purpose of monitoring the recording process. In such a camera, a RECORD/MONITOR switch is usually provided so that when a monitoring operation is taking place, the camera pick-up, recording and reproducing means are immediately activated. Unfortunately, the addition of this record/monitor switch further reduces the compactness of the camera.

SUMMARY OF THE INVENTION

In view of the above, an object of the present invention is to minimize the number of operating members which are used to actuate the changing or setting of various functions and modes of a camera.

Another object of the present invention is to reduce the size of the camera by reducing the number of operating members.

An advantage of the present invention is the ability of the camera to automatically switch between a record mode and a playback mode without the need for any special external switch manipulation.

A further advantage of the present invention is that the camera does not immediately start operating when a function switch, provided on the camera, is switched from a record mode to a playback mode.

A further advantage of the present invention is that the number of operating switches needed to control the camera does not need to be increased as additional functions and capabilities are added to the camera, such as the ability to switch between a record mode and a playback mode.

The present invention resides in a mode changing device for a photographic camera that is provided with means for selectively setting one photographic mode from a plurality of photographic modes. The mode changing device comprises means for changing an operating mode of a camera, and means for setting the mode changing means, wherein a single selector means enables the mode setting means to execute a photographic mode changing operation.

A still video camera constructed according to the above can be easily operated because a single selector means is used to change the operating modes of the camera.

The present invention also resides in a time/date stamping device for a photographic camera, which comprises means for selectively setting one function mode from a plurality of function modes, in which the operation of the camera is controlled and a plurality of modes associated with each of the function modes, means for displaying the plurality of function modes or settings associated with each of the function modes, means for selectively changing the function that is displayed on a display means, means for actuating the mode changing means by an external operation, means for selectively displaying a date display and a time display on the display means, and means for selecting one mode from the plurality of modes associated with each function mode associated with the mode changing means, wherein the display of the date/time setting means is selected by the mode changing actuator means.

Such an arrangement allows one to select or change the modes associated with the time/date stamping means, and the other operating means to be accomplished by a common mode changing actuating member. Consequently, the number of operating members are sufficiently reduced so as to achieve a desired compactness of the camera and to facilitate the ease of operation of the camera.

According to another aspect of the present invention, an exposure compensating device for a photographic camera comprises means for calculating an exposure value, means for automatically setting an exposure on the basis of an exposure value calculated by the exposure calculating means, means for compensating the set exposure by activating the automatic exposure means on the basis of an exposure value that is subjected to a predetermined compensation with respect to the exposure value given by the exposure calculating means, means for activating the exposure compensating means, means for changing the exposure compensation value produced by the exposure compensating means, and means for activating the exposure compensation value changing means.

The exposure compensating device constructed according to the present invention can be operated in a simple manner because the exposure compensating value is operated by manipulating a single exposure value changing actuator means.

According to another aspect of the present invention, a still video camera comprises an image pick-up means for generating video signals of an object to be photographed, means for recording the video signals generated by the image pick-up means onto a recording medium, and means for reproducing the video signals recorded on the recording medium, the still video camera further comprising means for outputting signals reproduced by the reproducing means to an external apparatus, means for switching the operating mode of the camera from a record mode to a playback mode, activating the reproducing means when connection means on the external apparatus are electrically connected to the outputting means, and switching the operating mode of the camera to the record mode, activating the recording means, when the connection means are electrically disconnected from the output means.

Such a still video camera automatically changes between the record mode and the playback mode upon the connecting or disconnecting of the connection means to the output means. Therefore, the camera does not require an operating member for switching between the record and playback mode, resulting in a simplified operating and more compact camera.

The present invention resides, according to another aspect of the invention, in a camera that comprises means for recording video signals onto a recording medium, means for reproducing the recorded signals, means for selectively changing a record mode, in which a recording means is activated, and a playback mode, in which a playback means is activated, and a playback initiator switch to activate the playback means, wherein the playback means starts the playback of the recorded signals when the playback initiator switch is turned on after the playback mode has been selected.

In such a still video camera, once the playback mode has been selected, the reproduction of the recorded signals awaits the operation of the playback initiator switch. Such a construction avoid the unnecessary consumption of electrical power.

BRIEF DESCRIPTION OF THE DRAWINGS

The foregoing and other objects, features, and advantages of the invention will be apparent from the following more particular description of a preferred embodiment of the invention, as illustrated in the accompanying drawings, in which reference characters refer to the same parts throughout the views. The drawings are not necessarily to scale, emphasis instead being placed upon illustrating the principles of the invention in a clear and concise manner.

FIGS. 7A-7C; 8A-8D; 9A-9B; and 10A-10B are diagrams showing a record/playback mode display section portion of the LCD panel of FIG. 3, indicating different operating modes;

DETAILED DESCRIPTION OF PREFERRED EMBODIMENTS

The following description of the present invention is by way of example with reference to the accompanying drawings.

Figure 1:
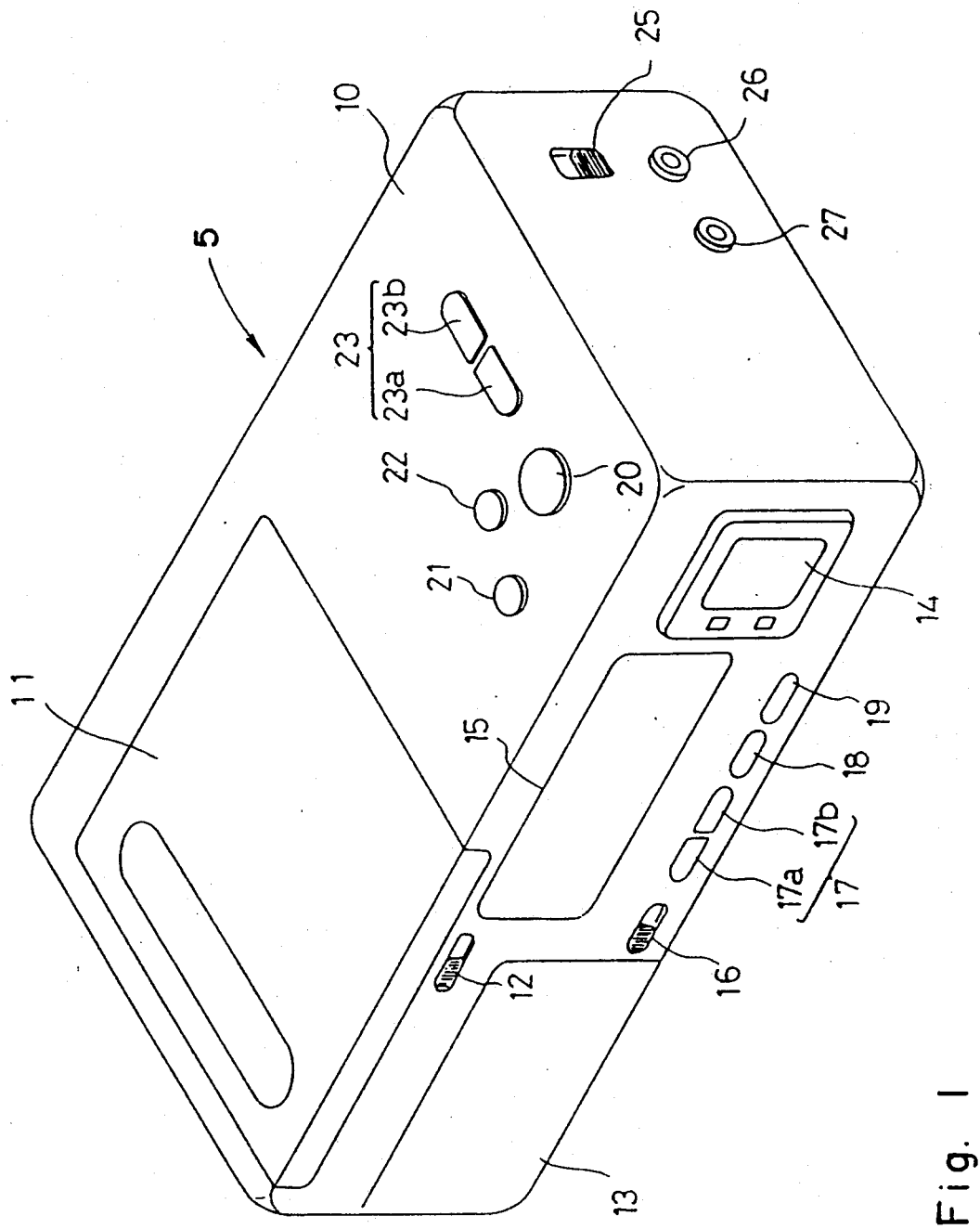
FIG. 1 is perspective view showing the outer appearance of a still video camera incorporating the present invention, as viewed from the rear side.

FIG. 1 is a perspective view, showing the rear of a still video camera 5 which incorporates the present invention. The still video camera 5 of the preferred embodiment comprises a rectangular camera body 10 that has a cover 11 which is located on the top of the camera body 10 proximate a left edge of the camera body 10. A magnetic disc 37 (shown in FIG. 2) is removably loaded into the camera 5 via the cover 11. The inner surface of the cover 11 has a disk holder which, in a closed position, holds the magnetic disc in a holding state, and when the cover is in an open position holds the magnetic disc in an unloading state. The cover 11 is normally biased by a spring member to be rotatably opened, but is locked by a locking mechanism in the closed position. The locking mechanism is released by pressing an eject button 12 located on the camera body 10.

Figures 3, 4A, 4B, 4C:
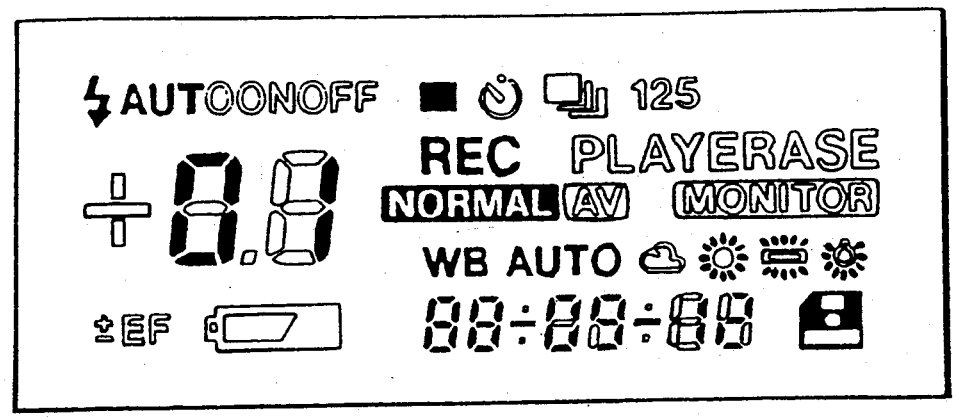
FIG. 3 is a front view showing an LCD panel used with the still video camera of FIG. 1.
FIGS. 4A-4C are diagrams showing various strobe displays modes on a strobe display section of the LCD panel of FIG. 3.

A battery cover 13, located on a rear side of the camera body 10, allows a battery to be selectively loaded into the camera. A view finder eyepiece 14 and an LCD panel 15 are also located on the rear side of the camera body 10. As shown in FIG. 3, the LCD panel 15 comprises a plurality of display segments for displaying various pieces of information, such as the number of tracks on which signals have already been recorded, a photographic mode of the camera, a record/playback mode of the camera, and a time/date stamping feature which indicates the date and time by corresponding letters or icons.

Located below the LCD panel 15 are a plurality of switches, such as a power switch 16, an up/down switch 17, comprising an up-switch 17a and a down-switch 17b, a mode switch 18 that operates as a mode changing actuator means, and a selective switch 19 that functions as a selector means. In the preferred embodiment, the power switch 16 comprises a two position ON/OFF slide switch, while the up/down switch 17, mode switch and selective switch 19 comprise normally open push button type switches.

Located on the top of the camera body 10, proximate a right edge, is a release button 20, a strobe switch 21, an exposure compensation switch 22 and a zoom switch 23, comprising a TELE-switch 23a and a WIDE-switch 23b. The release button 20 is actually a two-stage push button, in which a play switch SWP is turned ON when the release button 20 is depressed halfway and a release switch SWR is turned ON when the release button 20 is fully depressed. The strobe switch 21, exposure compensation switch 22 and zoom switch 23 comprise normally open push button switches.

Located on one transverse side of the camera body 10 is a copy/monitor change-over switch 25, an audio visual (AV) output connector 26 which serves as a means for connecting the camera 5 to an external apparatus, and a power input jack 27 which serves as an external power source input terminal. The copy/monitor change-over switch 25 comprises a slide switch which selects either a composite output signal (or a sound only monitor output signal when an audio signal is being reproduced) of the information recorded onto the magnetic disc 37 or a demodulated signal that is outputted to the AV output connector 26.

Located on a front side (not shown in FIG. 1) of the camera body 10 is an objective zoom lens 30, (shown in FIG. 2) a strobe flash unit 52, (shown in FIG. 2) an objective of the view finder, (not shown) and light projecting/receiving windows (not shown) for performing range finding.

Figure 2:
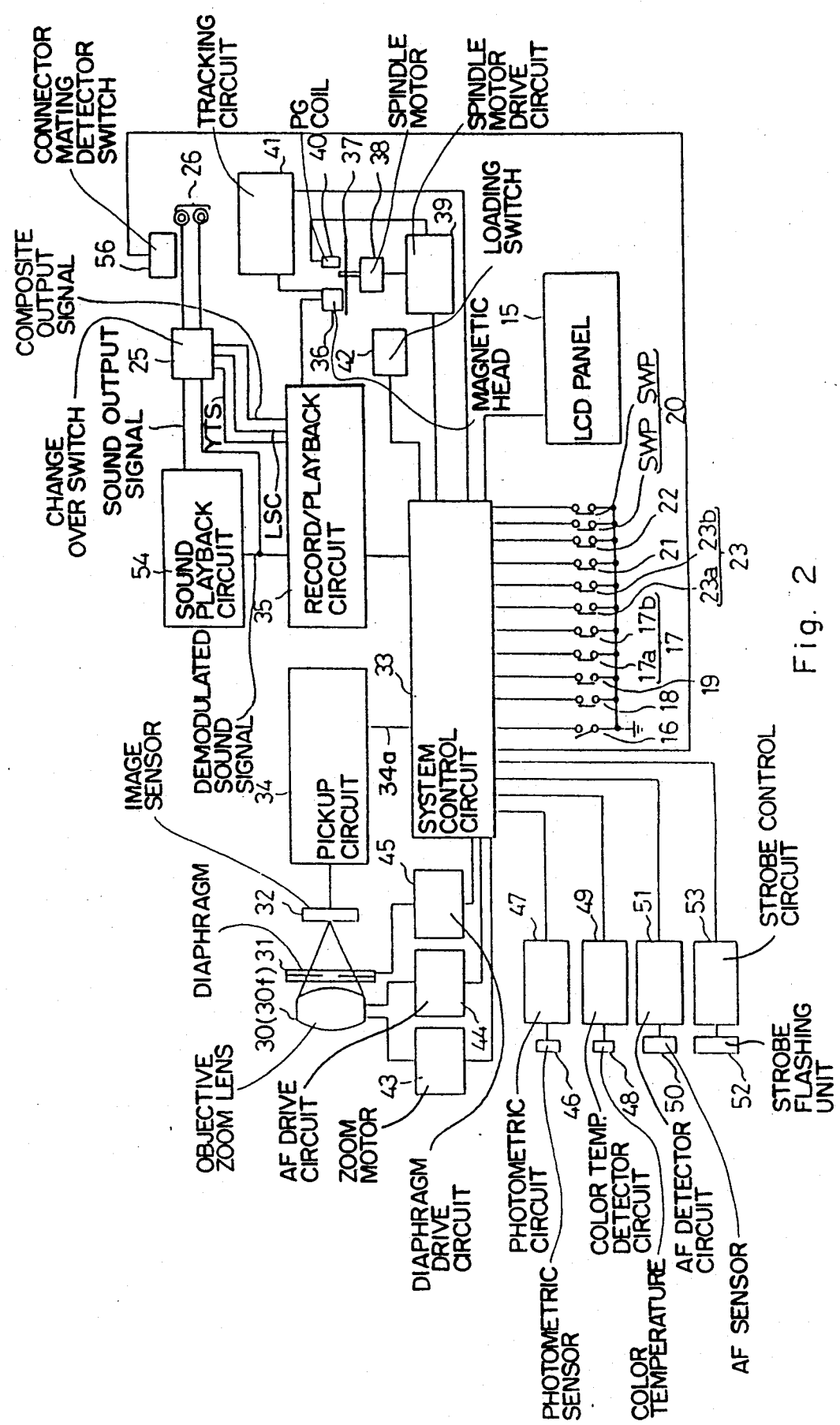
FIG. 2 is a block diagram schematically illustrating an internal system of the still video camera of FIG. 1.

With reference to FIG. 2, a diaphragm 31 and an image sensor 32 are positioned behind the zoom lens 30, so that an object to be photographed is focused by the zoom lens onto a light receiving surface of the image sensor 32. While the preferred embodiment employs a CCD image sensor as the image sensor 32, other types of image sensors, such as a MOS image sensor, can be employed without diverging from the scope of the invention.

A pick-up circuit 34 receives a signal produced by the image sensor 32, which is then forwarded to a system control circuit 33 to perform an integration (storage of the signal charge) and transfer of the signal charge. A signal charge of each picture element stored in the image sensor 32 is outputted to the pick-up circuit 34 which outputs a signal charge on line 34a to an image recording/reproducing circuit 35 in the form of a video signal. The record/playback circuit 35 processes the video signal, converting into a brightness signal Y+S, color difference line sequential signals B-Y, R-Y and a data signal. These signals are recorded, after being frequency modulated, by a magnetic head 36 onto a predetermined track of the magnetic disc 37.

The magnetic disc 37 is rotatably driven by a spindle motor 38. The rotational speed of the spindle motor 38 is controlled by a spindle motor drive circuit 39 which is, in turn, controlled by the system control circuit 33. Pulses generated by a PG coil 40, as the magnetic disc 37 rotates, are fed back to the spindle motor drive circuit 39. Thus, the spindle motor drive circuit 39 functions as a servo circuit to control the speed of the spindle motor 38, based on the PG signal coming from the spindle motor 38. The magnetic head 36 accesses a track on the magnetic disc 37 under the control of a tracking circuit 41. Signals are recorded onto the magnetic disc 37 using either a field recording or a frame recording technique. The magnetic head 36 is displaced one track at a time by the operation of the up/down switches 17.

A loading switch 42 detects when the magnetic disc 37 has been loaded into the camera 5 and produces a detection signal that is supplied to the system control circuit 33.

The zoom lens 30 is constructed such that a variable magnification lens group is moved by a zoom motor 43 along the optical axis of the zoom lens 30, while a focusing lens group is moved by an AF (automatic focusing) drive circuit 44. The diaphragm 31 is controlled by a diaphragm drive circuit 45. The zoom motor 43, AF drive circuit 44, and diaphragm drive circuit 45 are controlled by the system control circuit 33.

The still video camera further includes a photometric sensor 46, a color temperature sensor 48 and an AF sensor 50. The photometric sensor 46 receives a pencil ray of light that is reflected from the object to be photographed and converts them to a voltage signal that is forwarded to a photometric circuit 47. The photometric circuit 47 converts the voltage signal to a corresponding object brightness of a predetermined form by performing a logarithmic compression and analog-to-digital (A/D) conversion of the voltage signal. The brightness signal is then outputted to the system control circuit 33, where a predetermined exposure calculation is performed according to the object brightness signal so as to set an F-stop value of the diaphragm 31 and an integrating time of the image sensor 32.

The color temperature 48 is responsive to the pencil rays of light, which are outputted to a color temperature detector circuit 49. A color temperature detector circuit 49 converts the color temperature to color temperature signals of a predetermined form by performing a logarithmic conversion on the signals. The signals are then outputted to the system control circuit 33, which arithmetically compares the blue and red color temperature signals to perform a white balance adjustment.

The AF sensor 50 comprises a triangular distance sensor having a light projector and a light receiver. An AF detector detective circuit 51 processes an object distance signal outputted from the AF sensor 50 to obtain a distance signal of a predetermined form, which is then inputted to the system control circuit 33. The system control circuit 33 performs a predetermined operation on the basis of the predetermined distance signal to calculate a displacement of a focusing lens group 30f which is then driven to a focusing position by the AF drive circuit 44.

The strobe flashing unit 52 is controlled by the system control circuit 33 via a strobe control circuit 53. In the present embodiment, the strobe has three operating modes: an automatic strobe mode in which the strobe automatically flashes when the object brightness falls below a predetermined value; a forced strobe mode in which the strobe is forcibly flashed independently of the object brightness; and an off mode in which the strobe does not operate. The three operating modes are selected by operating the strobe switch 21.

The still video camera 5 of the present invention has an ability to not only record and playback video images, but to also record and playback audio signals. However, for purposes of simplification, only an audio playback circuit 54 is shown in FIG. 2. Audio (voice) recording utilizes one track of the magnetic disc 3 in an arrangement that is well known to one of ordinary skill in the art. Consequently, an explanation of the audio playback circuit 54 need not be given.

The voice reproducing circuit 54 is electrically connected to the image recording/reproducing circuit 35. If the signal read by the magnetic head 36 during a playback operation is an audio signal, the image recording/playback circuit 35 outputs this audio signal to the audio playback circuit 54.

The audio playback circuit 54 comprises an analog-to-digital (A/D) converter, random access memory (RAM) and a digital-to-audio (D/A) converter. During an audio playback operation, the audio playback circuit 54 demodulates the read signal, converts the audio signal provided by the image recording/playback circuit 35 to a digital signal and stores the digital signal. The digital signal is then subjected to a time-based expansion process and re-converted to an analog signal which is outputted as an audio (voice) signal.

The AV output connector 26 is also electrically connected to the image recording/playback circuit 35 and the audio playback circuit 54 via the copy/monitor change-over switch 25. It should be understood that the system control circuit 33 comprises a microcomputer which includes various components, such as a central processor unit (CPU), read only memory (ROM) and RAM to control the still video camera 5. The microcomputer of the system control circuit 33 may function as a means for changing a plurality of operating modes, such as a photographing mode, depending on the software program contained therein.

The LCD panel 15 used in the camera of the preferred embodiment comprises a liquid crystal display, though other types of displays, such as an LED display, could be used without departing from the scope and spirit of the invention.

Referring to FIG. 3, letters and icons are displayed on the face of the LCD panel 15. In the LCD panel 15, blank areas represent a light-transmissive area where the liquid crystal is not illuminated, while black filled areas represent light absorptive areas wherein the liquid crystal is illuminated. The display shown in FIG. 3 indicates that the magnetic disc 37 has been loaded into the camera 5, the power switch 16 has been turned ON and no information has been recorded onto the disc. When the power switch 16 is turned OFF, all the items displayed on the LCD panel 15 disappear, except for the calendar display "88—09—12", which represents the year, month and day.

The LCD panel 15 can be classified into six display sections which are used to display the main functions and operating modes of the camera. Modes or operating values can be changed for every display section. Changing or setting a mode or operating value is performed by depressing the selector switch 19 or the up/down switch 17, while the changing of the display sections are effected by depressing the mode switch 18. During a mode changing operation, the set or selected display flashes, indicating that this is a selected mode. The respective displays will be discussed below, in connection with their functions.

FIG. 4 illustrates a display section associated with the operation of the strobe 32. Referring to FIG. 4(A), "AUTO" is illuminated to indicate that the strobe 52 is set to automatically flash when the brightness of an object to be photographed falls below a predetermined value.

When the strobe switch 21 is depressed, the display "AUTO" is replaced by the display "ON", as shown in FIG. 4(B). This indicates that the a forced strobe flashing mode has been selected in which, when the release button 20 is depressed, the strobe flashing unit 52 will be forced to flash, irrespective of the object brightness.

When the strobe switch 21 is depressed again, the display "ON" is replaced by the display "OFF", as shown in FIG. 4(C). This indicates that the strobe 52 has been manually turned OFF, so that it never flashes, even if the brightness of the object to be photographed is lower than a predetermined value.

When the strobe switch 21 is depressed once more, the display returns to the state indicated in FIG. 4(A). Specifically, the displays and the modes are cycled through the AUTO strobe mode, the forced ON strobe flashing mode, and the strobe OFF mode as the strobe switch 21 is successively depressed.

FIG. 5 illustrates a display section for indicating a photographing track number/exposure compensation value. Referring to FIG. 5(A), the display is illuminated to indicate that a recording will occur on the first track. When field recording photography is being performed, the object to be photographed is recorded on a single track when the release button 20 is depressed to effect an exposure and recording processing. When the object is recorded, the display is successively incremented to display "02", "03", etc. That is, the displayed number progressively increases by 1. When frame recording photography is being performed, the object to be photographed is recorded on a pair of tracks. Therefore, the displayed number progressively increases by increments of 2, i.e., "03", "05", etc.

Figure 5A:
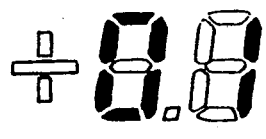
FIGS. 5A-5E are diagrams showing a display section indicating the number of photographic frames/exposure compensation value.
Figure 5C:
Figure 5E:
Figure 5B:

When the exposure compensation switch 22 is turned ON, the display section for indicating the photographing track number/exposure compensation value is changed, so as to display exposure compensation (EF) value of "+1.5", as shown in FIG. 5(B). The value "+1.5" indicates that the exposure has been increased by a value of +1.5 EV, with respect to the exposure value calculated by the system control circuit 33. Though +1.5 EV is employed as a reference exposure compensation value in the present embodiment, it is also possible to increase or decrease the exposure value in increments of 0.5 EV, within a range of plus or minus 2 EV. The exposure compensation value is displayed on the display section for indicating the photographing track number/exposure compensation value and is simultaneously written into a memory in the system control circuit 33.

Figure 5D:

If the compensation value differs from the reference value, the exposure compensation value changing display icon "±EF", located below the display icon "+" is illuminated, as shown in FIGS. 5(C) and 5(D). This display remains illuminated, even after the display is switched to indicate the photographing track. Thus, an indication is provided to the photographer that the exposure compensation value differs from the reference value, as shown in FIG. 5(E).

Changing the exposure compensation value is effected by depressing the up/down switch 17 after the exposure compensation switch 22 has been turned ON (i.e., the camera 5 is in the exposure compensation changing mode). Depressing the up-switch 17a increases the EV compensation value in increments of 0.5 EV, to a maximum of +2.0 EV. Depressing the down-switch 17b decreases the EV compensation value in decrements of 0.5 EV, to a maximum reduction of −2.0 EV.

The LCD panel 15 also includes an icon in the shape of a battery that is illuminated to warn the photographer that the battery is weak and should be replaced or recharged.

FIG. 6 illustrates a photographing mode display section that is provided on the LCD panel 15. FIG. 6(A) illustrates a single mode operation in which a single frame is recorded every time the release button 20 is fully depressed (i,e., the release switch SWR is changed from OFF to ON). FIG. 6(B) illustrates a self-timer mode of operation in which a recording is made a predetermined period of time after the release button 20 is fully depressed. FIGS. 6(C), 6(D) and 6(E) illustrate running shot operating modes of 1 frame/sec., 2 frames/sec. and 5 frames/sec., respectively. It should be understood that the term "running shot mode" means that the exposure and recording can be repeated as long as the release switch 20 is fully depressed.

Setting and changing the above-mentioned photographing modes are achieved by depressing the selector switch 19 when the camera 5 is in the photographing mode changing mode. The photographing mode display section successively cycles through the single operating mode, the self-timer mode, the 1 frame/sec. running shot mode, the 2 frames/sec. running shot mode, the 5 frames/sec. running shot mode and back again to the single operating mode every time the selector switch 19 is depressed while the camera is in the photographing mode changing mode.

The still video camera 5 of the present invention has a normal record mode, in which only an image is recorded; an AV record mode, in which both an image and audio are recorded; an erase mode, in which any information recorded on the magnetic disc is erased; and a playback mode, in which the recorded image or audio track is reproduced. Additionally, the camera has a monitor mode, in which the image being recorded can be simultaneously monitored. FIGS. 7 through 10 illustrate the various record/playback modes on a record/playback display section of the LCD panel 15.

Figures 7A, 7B, 7C, 8A, 8B, 8C, 8D:
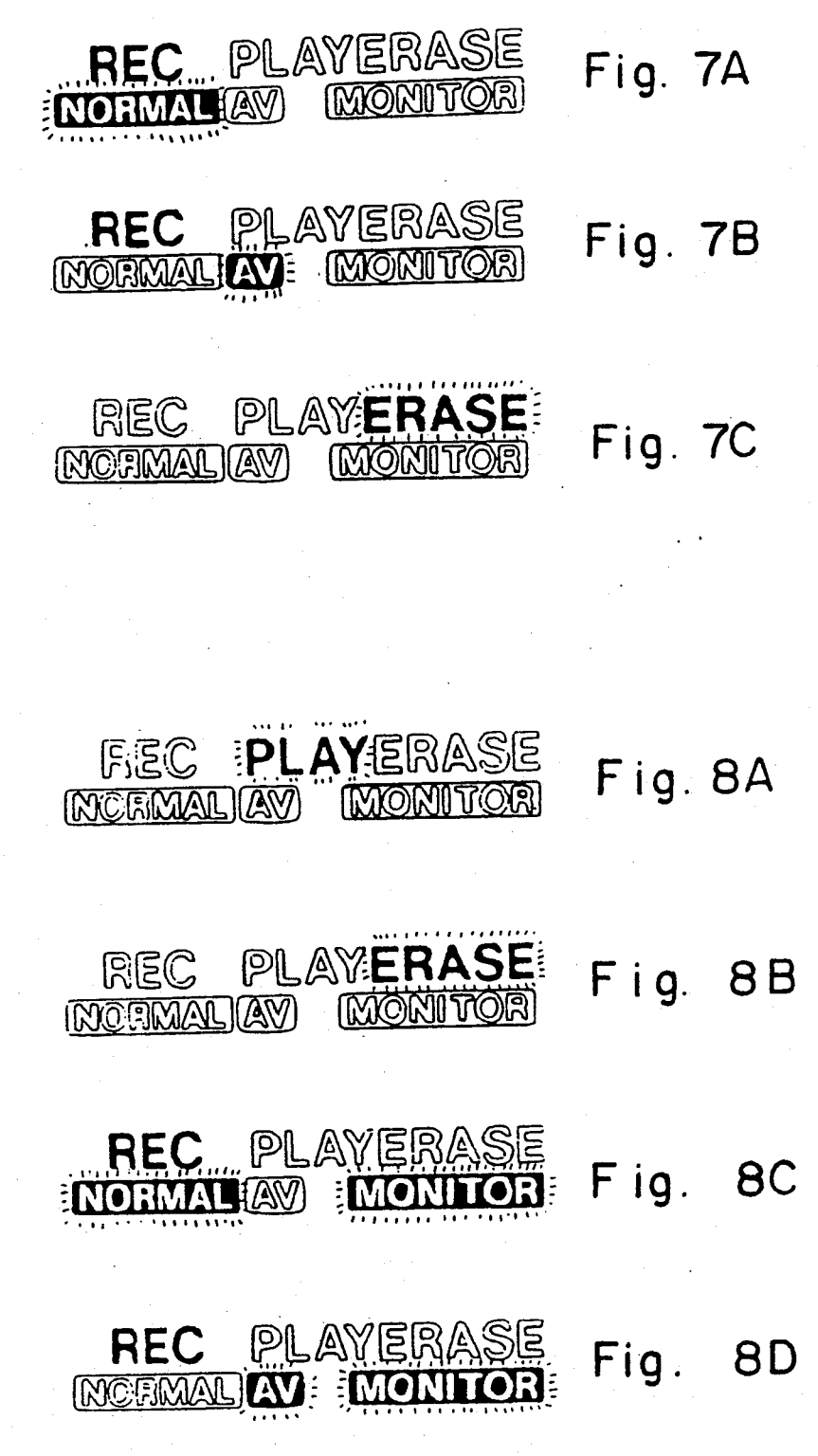
Figure 9A:
Figure 9B:

A normal record mode is represented by illuminating the "NORMAL" and "REC" icons, as shown in FIG. 7(A). The AV record mode is represented by illuminating the "AV" and "REC" icons, as shown in FIG. 7(B). The erase mode is indicated by illuminating the "ERASE" icon, as shown in FIG. 7(C). The playback mode is indicated by illuminating the "PLAY" icon, as shown in FIGS. 8(A), 9(A) and 9(B). The monitor mode is represented by illuminating the "MONITOR" icon, as shown in FIGS. 8(C), 8(D), 9(A) and 9(B).

The photographing mode setting mode has a plurality of options. The displays shown in FIGS. 7(A) to 7(C) are indicated during a normal photographing situation, in which the AV connector is not connected to a monitoring device, to indicate a normal record mode, an AV record mode or an erase mode.

When the AV connector is electrically connected to a monitoring device, the displays in FIGS. 8(A) through 8(D) are indicated, based on the operating mode of the camera 5. Specifically, FIG. 8(A) illustrates a playback operating mode; FIG. 8(B) illustrates an erase operating mode; FIG. 8(C) illustrates a normal record/monitor operating mode; and FIG. 8(D) illustrates an AV record/monitor operating mode.

Changing the record/playback operating mode is effected by depressing the selector switch 19 when the camera is in the record/playback mode changing mode. The indicated display cycles through displays shown in FIGS. 7(A) to 7(C) and back to FIG. 7(A) each time the selector switch 19 is successively depressed, as long as the AV connector is not electrically connected to a monitoring device. When the AV connector is electrically connected to monitoring device and the selector switch 19 is depressed, the LCD panel 15 cycles through the displays shown in FIGS. 8(A) to 8(D) and back to FIG. 8(A).

FIGS. 9A, 9B illustrate a stand-by playback condition and a playback condition, respectively, when the camera is in the playback operating mode. Once the playback mode has been set by the record/playback mode changing mode, the playback display "PLAY" flashes, as shown in FIG. 9(A). Upon depressing the release button 20 halfway (so as to turn ON the play switch SWP), playback of the recorded information begins. At that time, the "PLAY" icon is illuminated, as shown in FIG. 9(B).

Figure 10A:
Figure 10B:

FIGS. 10(A) and 10(B) illustrate a normal record/monitor operating mode. Once the normal record/monitor mode has been set by the record/playback operating mode changing mode, the "NORMAL" and "MONITOR" icons flash, as show in FIG. 10(A). When the release button 20 (play switch SWP is turned ON), monitoring starts and the "NORMAL" and "MONITOR" icons are illuminated, as shown in FIG. 10(B).

FIGS. 11(A) to 11(E) illustrate various white balance mode displays as indicated on a white balance display section of the LCD panel 15. The icon "WB" represents white balance. The icons "AUTO" represents that the camera 5 is placed in an automatic white balance adjustment mode; "CLOUD" represents that the camera 5 has been set to adjust the white balance for a cloudy weather scene; "SUN" represents that the camera 5 has been set to adjust the white balance for a sunny scene; "FLUORESCENT LAMP" represent that the camera 5 has been set to adjust the white balance for a scene in which a fluorescent lamp is present; and "INCANDESCENT LAMP" represents that the camera 5 has been set to adjust the white balance for a scene in which an incandescent lamp is present.

The white balance is selectively adjusted to either the auto, cloudy weather, sunny weather, fluorescent lamp or incandescent lamp mode. The display section corresponding to the selected mode is then illuminated. The setting of the white balance adjustment is effected by depressing the selector switch 19 when the camera 5 is in the white balance changing mode. As the selector switch 19 is repeatedly depressed, the setting of the white balance cycles from the automatic mode to the cloudy weather mode, to the fine weather mode, to the fluorescent lamp mode, to the incandescent lamp mode and back to the automatic mode.

FIGS. 12 and 13 illustrate a time/date stamping display section of the LCD panel 15 of the camera 5, constructed according to the preferred embodiment. The time/date stamping display section is used for selectively displaying the date and time. The date or time is always displayed on the LCD panel 15 as long as a battery has sufficient power to operate the camera 5, regardless of the setting of the power switch 16.

FIG. 12 illustrates a date display, such as Sept. 12, 1988. FIG. 13 illustrates a time display, such as 11:34:57. Hyphens, "-", are interposed between respective figures to indicate that the display is indicating a date. Conversely, colons, ":", are interposed between respective figures to indicate that the display is indicating a time.

Figure 12A:
FIGS. 12A-12D are diagrams showing a time/date display section of the LCD panel of FIG. 3 in the date display operating mode.
Figure 13A:
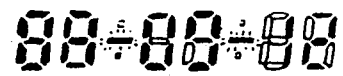
FIGS. 13A-13D are diagrams showing the time/date section of the LCD panel of FIG. 3 in the time display operating mode.

Adjusting the date or time is effected by depressing the up/down switch 17 when the camera 5 is in the time/date stamping changing mode. When the camera is set by depressing the mode switch 18 when the camera is in the time/date stamping changing mode, the hyphen "-" flashes for the date display and the colon ":" flashes for the time display, as shown in FIGS. 12(A) and 13(A).

Figure 12B:
Figure 12C:
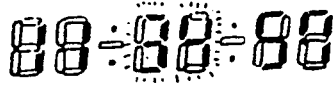
Figure 12D:
Figure 13B:

The first time the selector switch 19 is depressed, the left-most display section begins to flash, to indicate that the year or hour can be set, as shown in FIGS. 12(B) and 13(B). Subsequent depressions of the selector switch 19 causes the flashing display section to cycle through the year (hour), month (minute), day (second), and back to the year (hour).

Figure 13C:
Figure 13D:

When the up/down switch 17 is depressed during the period for which any section is flashing, a numerical value displayed on this section is incremented within a predetermined range. For example, if the month display section is flashing, as shown in FIG. 13(C), depressing the up-switch 17a causes the displayed numerical value to cycle between "10", "11", "12", "01", "02", "03", "04", "05", "06", "07", "08", "09", and back to "10". Depressing the down-switch 17b causes the displayed numerical value to change in the reverse direction. Though only two display formats of date and time are shown in this embodiment, the display formats are not limited to these two formats. For example, the year-month-day display may be replaced by a month-day-year display. Alternatively, the hour-minute-second display may be replaced by a day-hour-minute display. It can even be arranged so that these four display formats may be selectively employed.

Referring to FIG. 3, a square icon represents whether the magnetic disc 37 has been loaded into the camera 5. The square icon is illuminated when the magnetic disc 37 has been loaded into the camera and the loading switch 42 is ON.

The operating mode changing mode is cyclically changed by depressing the mode switch 17 in a manner to be described below.

When the magnetic disc 37 has been loaded and the power switch 16 is ON, the LCD panel 15 is illuminated, without flashing, as shown in FIG. 3. The first time the selector switch 19 is depressed, the photographing operating mode changing mode is selected and self-timer mode icon flashes, as shown in FIG. 6(B). When the selector switch 19 is depressed again, the flashing display on the photographing mode display section changes in the order described above.

When the mode switch 18 is depressed during the flashing condition of the photographing mode display section or during the initial condition, the display section changes from flashing to being fully illuminated. At the same time, the mode is changed over to the record/playback mode changing mode. As a result, the record/playback mode display section (i.e., normal record mode display) begins to flash, as shown in FIG. 7(A).

Figure 11A:
FIGS. 11A-11E are diagrams showing a white balance display section of the LCD panel FIG. 3 displaying different operating modes.

Depressing the mode switch 18 from the state as just mentioned changes the display segment from the flashing display to an illuminated display. Simultaneously, the operating mode of the camera 5 changes to the white balance setting mode. The white balance mode display section then begins to flash, as shown in FIG. 11(A).

When the mode switch 18 is depressed again, the flashing display is changed to an illuminated display and the operating mode of the camera is changed to the time/date changing mode. As a result, the date display on the time/date display section starts flashing, as show in FIG. 12(A). When the mode switch 18 is depressed once more, the time/date display section changes to flashing the time, as shown in FIG. 13(B).

When the mode switch 18 is depressed again, the flashing time display changes, wherein the time display is fully illuminated. At the same time, the operating mode of the camera changes to the photographing mode setting mode. As a result, the photographing mode display section starts flashing. In other words, the mode setting mode cyclically changes with each depression of the mode switch 18.

When the release button 20 (play switch SWP) is turned ON, the mode setting mode is released and all of the display sections become illuminated to indicate the entered settings.

After the mode setting has made a complete cycle, the date display is changed to indicate the time. By repeated depressings of the mode switch 18, the display on the time/date display section is changed from the time display mode back to the date display mode. Thus, the date display and the time display on the time/date display section can be easily changed from one display to another by merely depressing the mode switch 18. It should be understood that, according to the preferred embodiment, the time/date display is controllably driven by an automatic time/date circuit that is part of the system control circuit 33.

A basic operation of the still video camera 5 will now be discussed.

When the magnetic disc 37 is loaded into the camera, the loading detector switch 42 is turned ON, which is detected by the system control circuit 33. When the power switch 16 is turned ON, the spindle motor 38 starts rotating the magnetic disc 37 at a predetermined rate of rotation. Consequently, the magnetic head 36 accesses the first (outermost) track, to determine whether there is any information. The checking step is achieved by scanning the surface of the magnetic disk 37 with the magnetic head 36. Any signals detected by the magnetic head 36 are supplied to the system control circuit 33, which determines whether the magnetic head 36 has picked up any valid image or audio signals from the scanned track.

The magnetic head 36 is positioned on this track if the latter has no information recorded thereon, and is transferred to the next track if the first track has any information recorded thereon. The next track is then checked in the same manner as the first track. As a result of the checking, the magnetic head 36 is positioned on the first track which proves to contain any valid audio or image information. Thus, a position initialization of the magnetic head 36 is completed and the track number on which the magnetic disc 36 is positioned is displayed on the photographing track number/exposure compensation display section of the LCD panel 15.

When the release button 20 is depressed halfway, the play switch SWP is turned ON. This actuates the photometric circuit 47, the AF detector circuit 51 and the color temperature detector circuit 37, so that the photometric calculation, the range finding calculation and the white balance calculation can be performed by the system control circuit 33.

Based on the result of the above calculations, the diaphragm 31 is opened by the diaphragm drive circuit 45 to a predetermined F-stop value and the focussing lens group of the objective zoom lens 30 is moved by the AF drive circuit 44 to the proper focussing position, so as to obtain a white balance adjustment value for the pickup circuit 34. If the photometric value is lower than a predetermined value, i.e., the object to be photographed is dark, the strobe control circuit 53 is initiated to start the charging of a strobe capacitor.

When the release button 20 is fully depressed so as to turn ON the release switch SWR, an integration start/stop processing of the image sensor 32 occurs and video signals are outputted from the image sensor 32. These video signals are processed by the pickup circuit 34 and the image record/playback circuit 35 to produce a predetermined frequency modulated (FM) signal, which is recorded onto a track of the magnetic disc 37 by the magnetic head 36.

When the recording process is completed, the magnetic head 36 is positioned proximate the next track and the display on the photographing track number display section of the LCD panel 15 is incremented by one (when a field recording process is used; otherwise, the track number is incremented by two).

The camera operation as described above is a standard photographing operation. With the still video camera of the present invention, it is possible to record the date and/or the time onto a data sector of the track as part of the data signals of a recorded image.

When the camera is in the playback operation mode, the AV connector 26 is electrically connected to a monitoring device, such as a monitor TV set. Consequently, a connector mating detector switch 56 is turned ON, which is detected by the system control circuit 33 so that the playback operating mode is selected. At the same time, the record/playback mode display section of the LCD panel 15 begins flashing "PLAY" icon, as shown in FIG. 8(A).

When the release button 20 is depressed in the playback mode, signals recorded on a given track are read by the magnetic head 36 and outputted to the record/playback circuit 35, which determines whether the reproduced signals are video signals or audio signals.

If the signals are audio signals, they are outputted to the sound playback circuit 54 and the copy/monitor change-over switch 25. The audio signal retrieved from the magnetic disc is temporarily stored in a memory in the sound playback circuit 54, subjected to a time-based expansion process, and outputted from the memory to the copy/monitor change-over switch 25.

If the retrieved signals are image signals, a demodulated separated brightness Y+S signal, color difference signal LSC and composite output signal are outputted to the copy/monitor change-switch 25. These signals are then outputted from the copy/monitor change-over switch 25 to the AV output connector 26 via a path to be described below.

If the copy/monitor change-over switch 25 has been switched to the copy side, audio signals outputted from the sound playback circuit 54 are outputted to the AV output connector 26, while image signals (i.e., brightness Y+S signal and the color difference signal LSC) are outputted to the AV output connector 26. If the change-over switch 25 has been set to the monitor position, audio signals from the record/playback circuit 35 are outputted to the AV output connector 26, while image signals (i.e., a composite video signal) is outputted to the AV output connector 26. In this manner, dubbing can be performed with the signals being substantially free from distortion and noise because demodulated, rather than composite video signals are used.

If the connector mating detector switch 56 has not been turned ON, i.e., the AV connector is not electrically connected to the AV output connector 26, no change over to the playback mode occurs, even if the mode switch 18 is operated. Thus, battery consumption is not needlessly used.

The operation of the system control circuit 33, as it relates to the mode changing operation and the display thereof for the still video camera of the present invention will now be described. Reference should be made to the flowcharts of FIGS. 14A through 20. However, prior to the detailed description, a main operation of the system control circuit 33 will be summarized.

The system control circuit 33, as previously mentioned, includes a CPU which operates in accordance with a software program stored in a ROM of the CPU to realize the mode changing operation of the present invention.

When the power switch 16 is turned ON, a mode setting bit, interrupt enabling bit and certain other conditions are initialized. The memory associated with the display for indicating the number of photographing tracks is initialized when the loading switch 42 is turned OFF, i.e., upon removal of the magnetic disc 37 from the camera 5.

After the initialization steps have been completed, the position-initialization of the magnetic head 36 and the displaying of information on the LCD panel 15 are executed. After the position-initialization of the magnetic head 36 has been performed, the interval timer starts and the status of the switches 18 and 20-23 are inputted at predetermined intervals.

If any one of the switches 18, 20-23 is ON, a subroutine associated with the switch is executed. For example, if the zoom switch 23 is ON, a subroutine associated with a zooming operation is executed and the zoom lens group 30 is moved under the control of the zoom motor drive circuit 43 to achieve a desired zooming. Similarly, if the release button 20 (PLAY switch SWP) is turned ON while the camera is in the record mode, a subroutine associated with the photographing mode is executed and the processing of exposure factors, such as AF, photometric calculation, adjustment of the diaphragm, integration and white balance adjustment, and processing for recording the image onto the magnetic disc 37, etc., are controlled. If the mode switch 18 is ON, a mode setting subroutine is executed and the mode setting is controlled.

When the power switch 16 has been turned ON and predetermined conditions have been initialized, mode Number M is set to 0. Mode Number M is incremented every time the mode switch 18 is turned ON and the value thereof cyclically changes within a range from 0 to 4. It should be understood that a photographing mode changing subroutine is called when mode Number M is 0, a white balance mode changing subroutine is called when mode Number M is 2, and a time/date mode changing subroutine is called when mode Number M is 3 or 4.

N represents a select number which corresponds to certain mode Numbers, such as N(0), N(1), N(2), N(3) and N(4). The select value associated with each select Number N is incremented up to 4, every time the selector switch 19 is turned ON, at which time it is reset to 0. In other words, the select values cyclically change. The data displayed on the respective sections of the LCD panel 15 are determined by the values of the select Number N.

When the up/down switch 17 is operated, the magnetic head 37 is successively moved toward the outermost or innermost track. Turning ON the selector switch 19 causes the photographing modes to change. A discussion relating to the operation of the magnetic head 37 access operation is unnecessary for an understanding of the present invention. Accordingly, an explanation thereof is omitted.

Figure 14A:
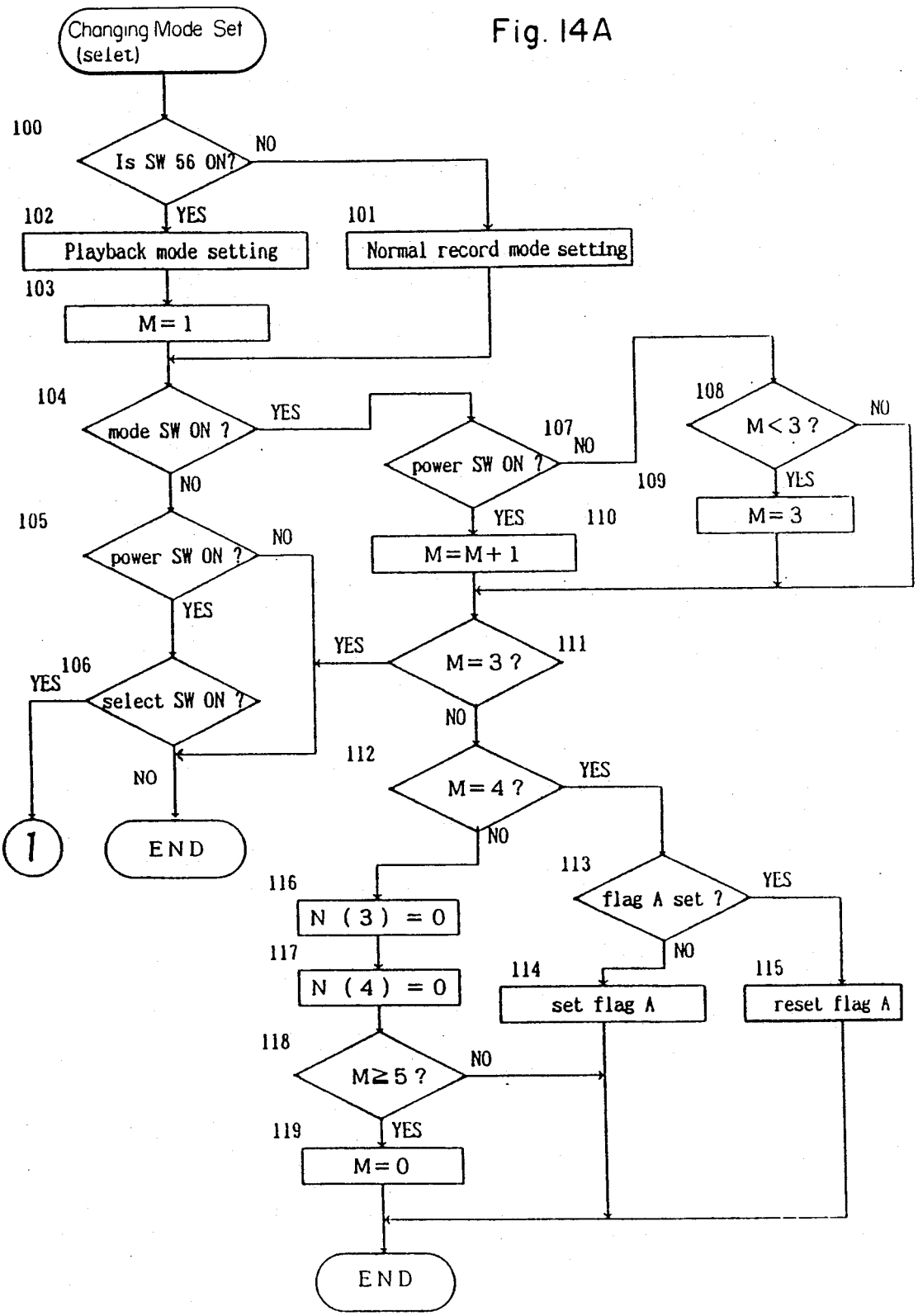
FIGS. 14A and 14B are flowcharts illustrating the steps involved in executing the mode changing operation.
Figure 14B:
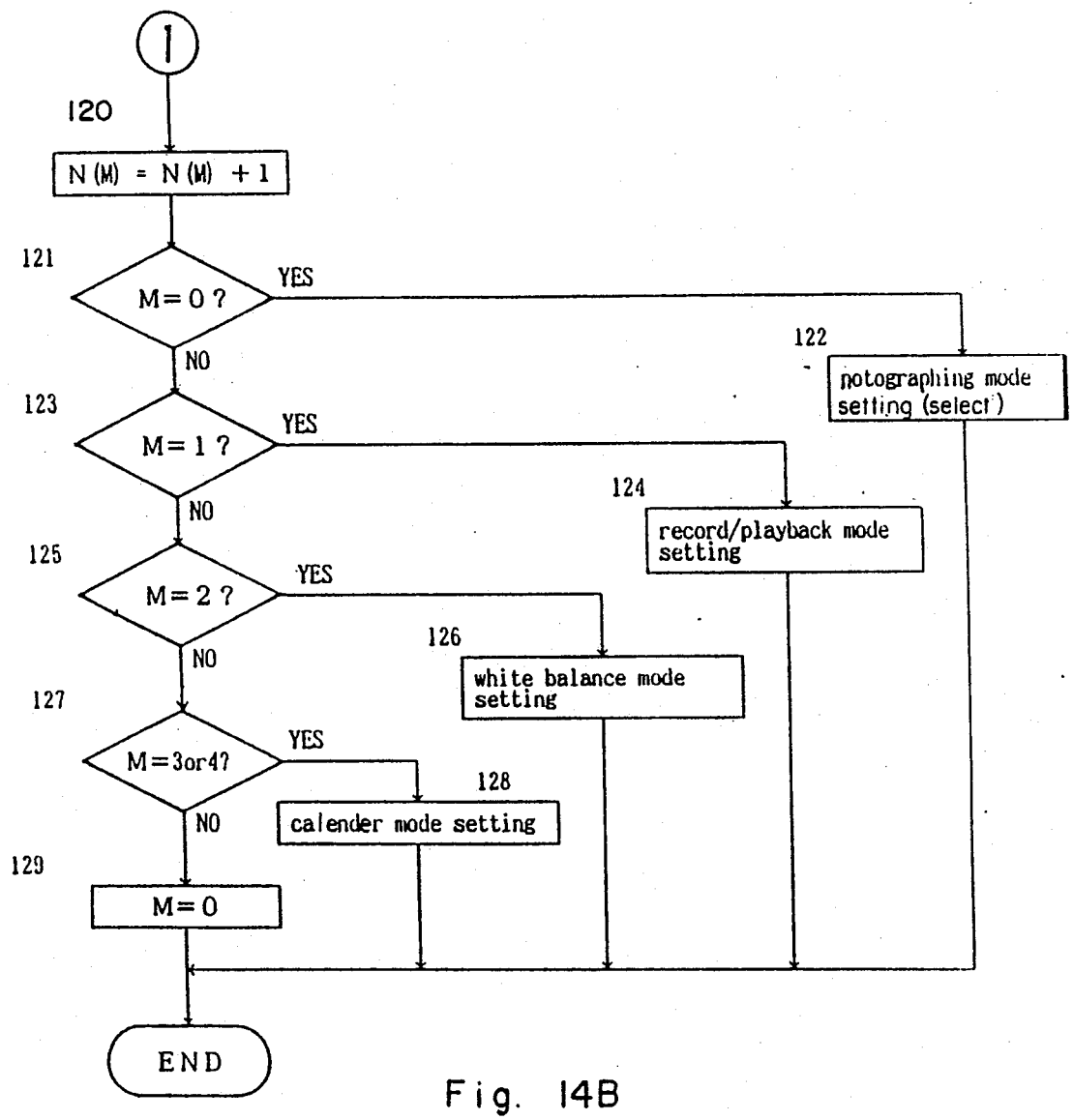

The operation of the system control circuit 33 in the mode change processing will now be described, with reference to FIGS. 14A and 14B. When the mode switch 18 or the selector switch 19 is turned ON, the camera switches from a standby mode to execute a MODE CHANGING SUBROUTINE. The MODE CHANGING SUBROUTINE functions to select an operating mode to be made ready for mode changing.

In a step 100, a determination is made as to whether the AV connector has been mated with the AV connector 26 (i.e., is the connector mating detector switch 56 ON?). If the connector mating detector switch is ON, the subroutine proceeds to step 102 to set the record/playback mode to the normal playback mode and illuminate the "NORMAL PLAY" icon on the record/playback display section of the LCD panel 15. Processing then proceeds to step 103 to set mode Number M to 1. In this way, the connection of the AV connector with the AV output connector 26 automatically sets the mode Number M to 1, which is a ready condition for the record/playback mode setting mode, as will be described below in more detail. Processing then proceeds to step 104.

If the switch 56 is OFF, the subroutine proceeds to step 101 to set the record/playback mode to the normal record mode and illuminate the "NORMAL REC" icon on the record/playback display section of the LCD panel 15, after which the subroutine proceeds to step 104.

Step 104 checks whether the mode switch 18 has been turned ON. If it is ON, the subroutine proceeds to step 107, while if the switch 18 is OFF, the subroutine proceeds to step 105. In other words, the subroutine proceeds to the step 107 so long as the mode switch 18 remains depressed.

If the mode switch 18 is not depressed, step 105 checks whether the power switch 16 is ON. If the power switch is OFF, the subroutine proceeds to an END process. If the power switch 18 is ON, the subroutine proceeds to step 120. The END process is a process that exits from the subroutine. After the subroutine exits, the stand-by condition is restored. When the mode switch 18 is turned ON, this subroutine is re-executed.

If step 104 determines that the mode switch 18 is ON, step 107 checks whether the power switch 16 has been turned ON. If the switch 16 is ON, the subroutine proceeds to step 110 to increment the mode Number M by 1, before proceeding to step 111. By incrementing the mode Number M by 1, the operating mode to is to be made ready for mode changing cyclically changes, so long as the mode switch 18 continues to be ON. If the switch 16 is OFF, the subroutine proceeds to a step 108.

Step 108 checks whether the mode Number M is less than 3. If it is less than 3, the subroutine proceeds to step 109 to set the mode Number M to 3, before proceeding to step 111. If it is not less than 3, processing proceeds to step 111, without changing the mode Number M.

When this subroutine is entered and the power switch 16 is turned OFF, steps 107 to 109 cause the mode Number M to be set to 3, thereby enabling a TIME/DATE CHANGING subroutine, which will be described below.

Step 111 checks whether the mode Number M is equal to 3. If it is equal to 3, the subroutine proceeds to the END process. The END process changes the display on the time/date display section of the LCD panel 15 to the date display. If it is not equal to 3, step 112 is performed to check whether the mode number M is equal to 4.

If the mode Number M is equal to 4, processing proceeds to step 113 to check whether flag A has been set. If the mode Number M is not equal to 4, processing continues at step 116.

If step 113 determines that flag A is not set, it is set in step 114, after which the subroutine advances to the END process. If step 113 determines that flag A is set, the flag is reset in step 115, after which the subroutine advances to the END process. Flag A functions to change the display on the time/date display section of the LCD panel 15 between the date display and the time display. Accordingly, flag A is inverted by the processes at steps 113 through 115 and the display manners corresponding to select Numbers N(3) and N(4) (date display and time display) are interchanged.

Step 116 sets select Number N(3) to 0. Thereafter, select Number N(4) is set to 0 in step 117 before processing advances to step 118. It should be understood that select Numbers N(3) and N(4) represent the time/date mode changing mode and 0 represents a condition in which no time/date mode changing occurs.

Step 118 checks whether mode Number M is greater than or equal to 5. If it is larger than or equal to 5, the subroutine proceeds to step 119 where mode Number M is set to 0. Thereafter, the subroutine proceeds to the END process. If it is less than 5, the subroutine proceeds directly to the END process. Specifically, mode Number M can be selectively set to 0 through 4, according to the present embodiment. Therefore, mode Number M is reset to 0 at steps 118 and 119 when mode Number M becomes 5 or larger. Accordingly, five repeated depressions of the mode switch 18 (four repeated depressions if the AV connector has been electrically connected to the AV output connector 26) brings the count value of mode Number M from 4 back to 0.

If the selector switch 19 is ON when step 106 is being performed, the subroutine proceeds to step 120, where select Number N(M) is incremented by 1. More specifically, mode Number M is incremented by 1 and select Number N is set to a value corresponding to mode Number M. Then, the subroutine proceeds to step 121.

Step 121 checks whether mode Number M is 0. If it is equal to 0, step 122 is performed to execute the PHOTOGRAPHING MODE SETTING MODE SUBROUTINE. Thereafter, the subroutine proceeds to the END process. If mode Number M is not 0, the subroutine proceeds to step 123.

Step 123 checks whether mode Number M is 1. If it is equal to 1 step 124 executes the RECORD/PLAYBACK MODE SETTING SUBROUTINE. Thereafter, the subroutine proceeds to the END process. If mode Number M is not equal to 1, the subroutine proceeds to step 125.

Step 125 checks whether mode Number M is 2. If it is equal to 2, step 126 executes the WHITE BALANCE MODE CHANGING SUBROUTINE. Thereafter, the subroutine proceeds to the END process. If mode Number M is not equal to 2, the subroutine advances to step 127.

Step 127 checks whether mode Number M is 3 or 4. If it is equal to 3 or 4, step 128 executes the TIME/DATE MODE SETTING SUBROUTINE. Thereafter, the subroutine advances to the END process. If mode Number M is not equal to 3 or 4, the subroutine advances to step 129.

Step 129 resets mode Number M to 0 and then proceeds to the END process.

After the END process has been executed, the release switch SWR is turned ON. Thus, the mode setting mode is released.

The mode changing processes in the respective modes, as mentioned above, will be described below with reference to FIGS. 15-18. When these processes are started, conditions ready for the photographing mode changing, record/playback mode changing, white balance mode changing and time/date display mode changing are respectively established.

Figure 15:
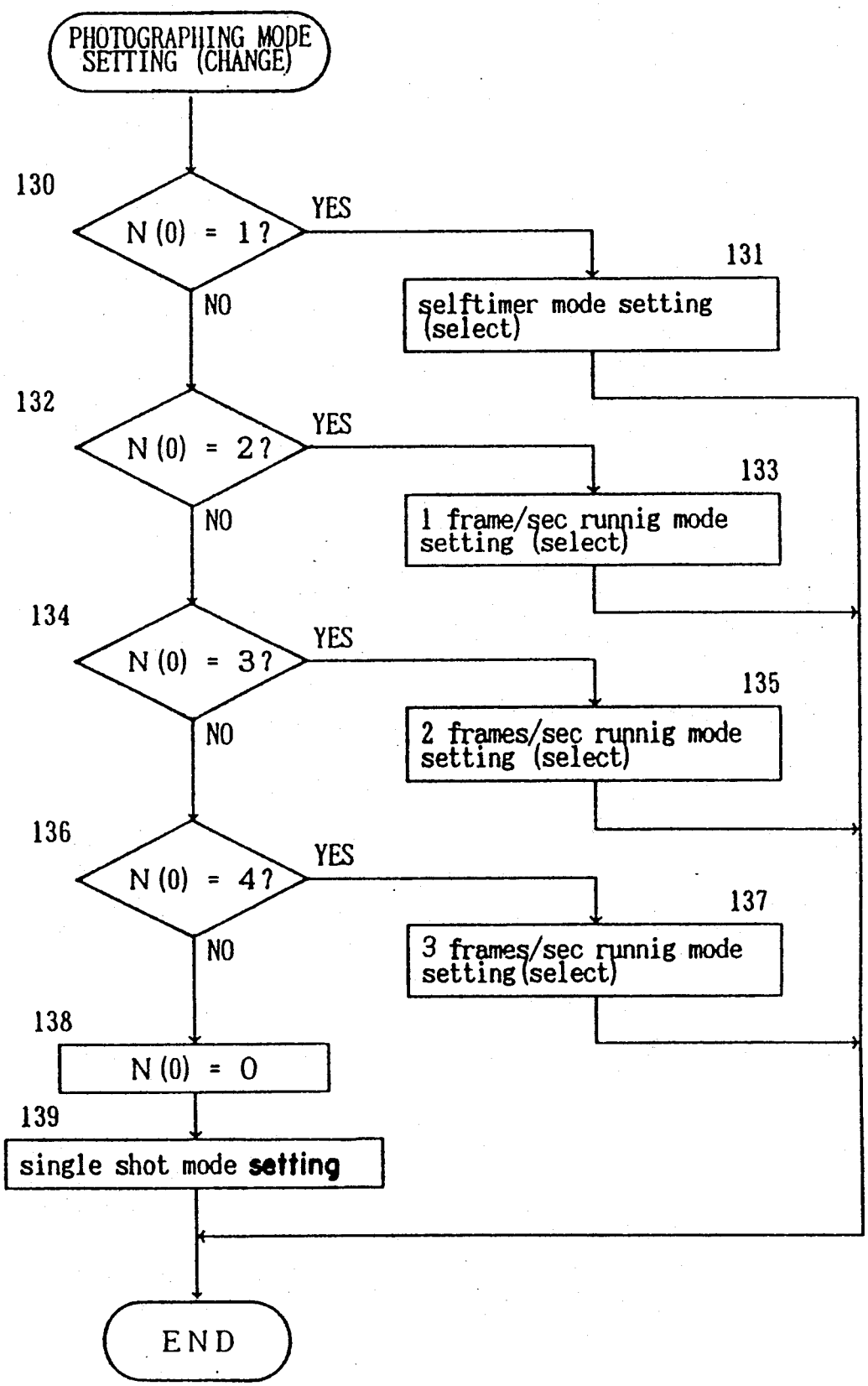
FIG. 15 is a flowchart illustrating the steps that are executed in performing a PHOTOGRAPHING MODE CHANGING SUBROUTINE.

Mode Number M is 0 when the selector switch 19 is first turned ON or the mode switch 18 is turned ON five times and the selector switch 19 is turned ON once with the power switch 16 being ON. This is determined in step 121, which then proceeds to step 122 from which the PHOTOGRAPHING MODE CHANGING SUBROUTINE, shown in FIG. 15, is executed.

In the PHOTOGRAPHING MODE CHANGING SUBROUTINE, step 130 checks whether select Number N(0) is 1. If it is equal to 1, step 131 is performed to execute the SELF-TIMER MODE SETTING SUBROUTINE. Step 131 executes the self-timer mode setting process, and changes the display on the photographing mode display section of the LCD panel 15 to that shown in FIG. 6(B). Thereafter, the subroutine advances to the END process. If select Number N(0) is not equal to 1, the subroutine proceeds to step 132.

Step 132 checks whether select Number(0) is 2. If it is equal to 2, step 133 is performed to execute the SINGLE FRAME/SEC. RUNNING MODE SUBROUTINE. Step 133 executes the single frame/sec. running shot mode setting, and changes the display on the photographing mode display section of the LCD panel 15 to that shown in FIG. 6(C). Thereafter, processing advances to the END process. If select Number N(0) is not 2, the subroutine advances to step 134.

Step 134 checks whether select Number N(0) is 3. If it is equal to 3, step 135 is performed to execute the 2

FRAMES/SEC. RUNNING SHOT MODE SUBROUTINE. Step 135 executes the 2 frames/sec. running shot mode setting, and changes the display on the photographing mode display section of the LCD panel 15 to that shown in FIG. 6(D). Thereafter, processing proceeds to the END process. If select Number N(0) is not 3, the subroutine proceeds to a step 136.

Step 136 checks whether select No. N(0) is 4. If it is equal to 4, step 137 is performed to execute the 5 FRAMES/SEC. RUNNING SHOT MODE SUBROUTINE. Step 137 executes the 5 frames/sec. running shot mode setting, and changes the display on the photographing mode display section of the LCD panel 15 to that shown in FIG. 6(E). Thereafter, processing advances to the END process. If select Number N(0) is not 4, the subroutine proceeds to step 138.

Step 138 sets select Number N(0) to 0 and then proceeds to step 139. After the selector switch 19 has been depressed 5 times, select Number (0) is returned from 4 to 0 in step 138.

Figure 6A:
FIGS. 6A-6E are diagrams showing a photographic mode display section indicating different modes of operation.
Figure 6B:
Figure 6C:
Figure 6D:
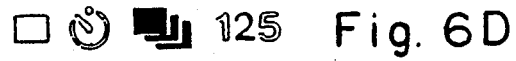
Figure 6E:
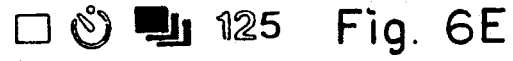

Step 139 executes the single shot mode setting, and changes the display on the photographing mode display section of the LCD panel 15 to that shown in FIG. 6(A). Thereafter, processing proceeds to the END process.

In conclusion, if the selector switch 19 is depressed when the power switch is turned ON, the processes at steps 100, 104, 105, 106, 120 and 122 are repeated every time the selector switch 19 is turned ON, or as long as the selector switch 19 remains turned ON and the photographing mode cyclically changes from the single mode, to the self-timer mode, to the single frame/sec. running shot mode, to the 2 frames/sec. running shot mode, to the 5 frames/sec running shot mode, and back again to the single mode.

The foregoing description relates to the PHOTOGRAPHING MODE SETTING SUBROUTINE which occurs when the selector switch 19 is depressed or when the mode switch 18 is depressed five times and the selector switch 19 is depressed once from the state under the condition that the AV connector is not mated to the AV output connector 26, after the power switch 16 has been turned ON.

Figure 16:
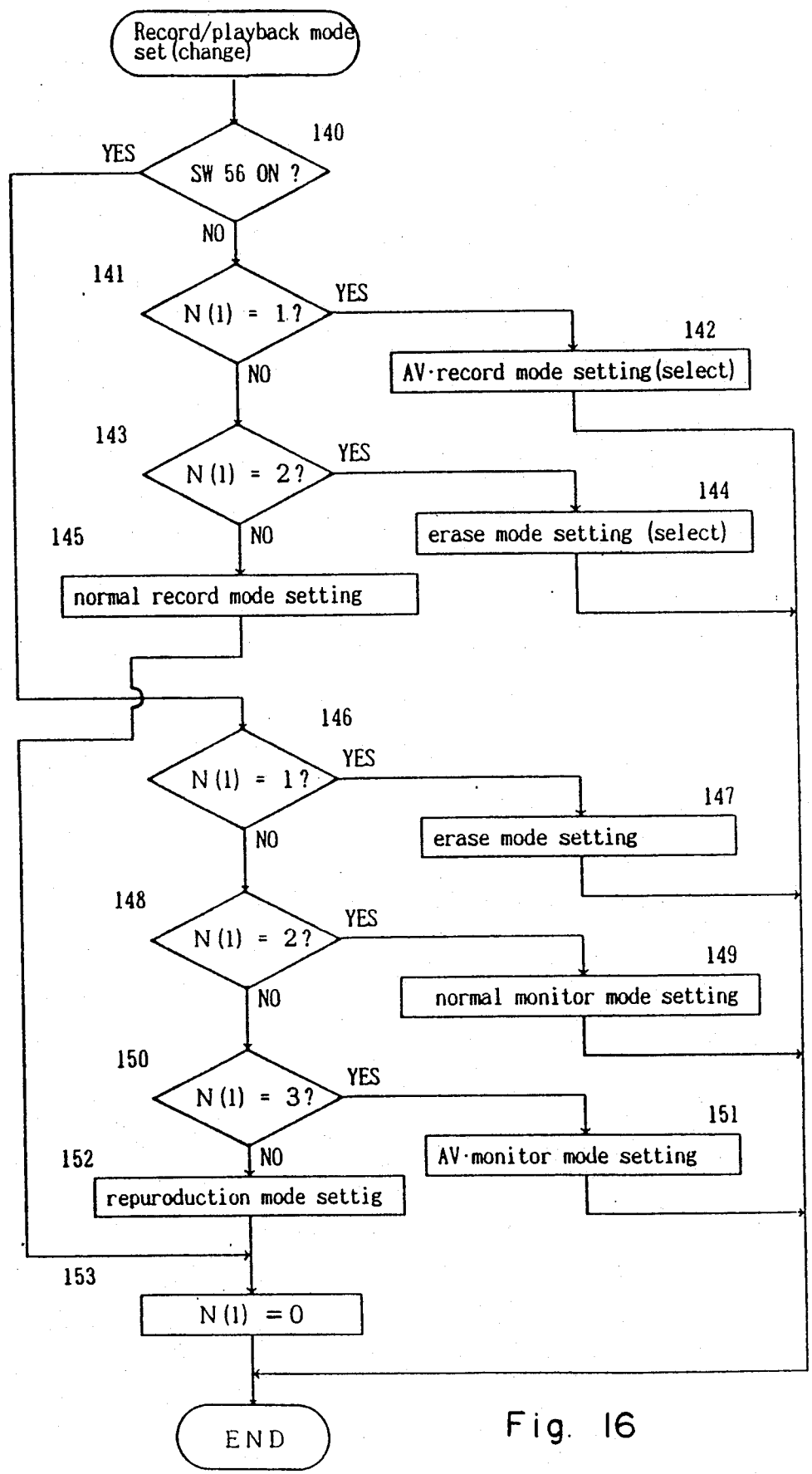
FIG. 16 is a flowchart illustrating the steps that are executed in performing a RECORD/PLAYBACK MODE CHANGING SUBROUTINE.

The process that occurs when the mode switch 18 is depressed once after the power switch 16 has been turned ON will now be described, with reference to FIG. 16. A single depression of the mode switch 18 changes the mode Number M from 0 to 1. Therefore, step 123 proceeds to step 124, from which the RECORD/PLAYBACK MODE SETTING SUBROUTINE (FIG. 16) is entered.

In the RECORD/PLAYBACK MODE SETTING SUBROUTINE, step 140 checks whether the connector mating detector switch 56 has been turned ON. That is, switch 56 is checked to determine whether the monitor or copy mode, in which the AV connector is electrically connected to the AV output connector 26, is established. If switch 56 is ON, the subroutine proceeds to step 146, while if the switch is OFF, the subroutine proceeds to step 141.

Step 141 checks whether select Number N(1) is 1; that is, whether the selector switch 19 has been turned ON one time. If a positive determination is obtained, the subroutine proceeds to step 142, while if a negative determination is obtained, the subroutine proceeds to step 143.

Step 142 executes the AV record mode setting, and changes the display on the record/playback mode display section of the LCD panel 15 to that shown in FIG. 7(B) before proceeding to the END process.

Step 143 checks whether select Number N(1) is 2, that is, whether the selector switch 19 has been depressed twice. If the determination is positive, the subroutine proceeds to step 144, while if the determination is negative, the subroutine proceeds to step 145.

Step 144 executes the erase mode setting, and changes the display on the record/playback mode display section of the LCD panel 15 to that shown in FIG. 7(C). Thereafter, processing proceeds to the END process.

Step 145 executes the normal record mode setting, and changes the display on the record/playback display section to that shown in FIG. 7(A) before advancing to step 153, which sets select Number N(1) to 0 and then proceeds to the END process. Specifically, step 120 increments the select Number (N), from the initial value of 0, by 1 every time the selector switch 19 is depressed. When select Number (N) reaches 3, step 153 resets this to 0, so that select Number (N) cyclically changes within a range from 0 to 2.

In conclusion, if the AV connector is not electrically connected to the AV output connector 26, the mode is set to any one of the normal record modes, the AV/record mode and the erase record mode and any one of these modes can be selected by operating the selector switch 19.

As mentioned above, step 140 jumps to step 146 if the AV connector has been electrically connected to the AV output connector 26. Step 146 checks whether select Number (1) is 1, that is, whether the selector switch 19 has been depressed one time. If the determination is positive, the subroutine proceeds to step 147, while if the determination is negative, the subroutine proceeds to step 148.

Step 147 executes the erase mode setting operation, and changes the display on the record/playback display section of the LCD panel 15 to that shown in FIG. 8(B), before proceeding to the END process.

Step 148 checks whether select Number N(1) is 2, that is, whether the selector switch has been depressed twice. If the determination is positive, the subroutine proceeds to step 149. If the determination is negative, the subroutine proceeds to step 150.

Step 149 executes the record normal monitor mode setting operation, and changes the display on the record/playback display section of the LCD panel 15 to that shown in FIG. 8(C). Thereafter, the END process is performed.

Step 150 checks whether select Number N(1) is 3; that is, whether the selector switch 19 has been depressed three times. If the selector switch has been depressed three times, step 151 is executed. However, if the selector switch has not been depressed three times, the subroutine proceeds to step 152.

Step 151 executes the AV record monitor mode setting operation and changes the display on the record/playback mode display section of the LCD panel 15 to that shown in FIG. 8 (D). Then, the END process is executed.

Step 152 executes the playback mode setting operation and changes the display on the record/playback display section to that shown in FIG. 8(A). Then, select Number N(1) is set to 0 in step 153 and the END process is performed.

More specifically, step 120 increments select Number (N), from an initial value of 0, by 1 every time the selector switch 19 is depressed. When select Number (N)

reaches 4, step 153 is performed to reset select Number (N) back to 0. Thus, select Number (N) changes within a range from 0 to 3.

In conclusion, when the AV connector is not electrically connected to the AV output connector 26, the RECORD/PLAYBACK MODE CHANGING SUBROUTINE changes, at predetermined intervals, the record/playback operating mode every time the selector switch 19 is turned ON or so long as the selector switch 19 remains turned ON, in the following order: record normal mode; AV record mode; erase mode; and back to the record normal mode.

When the AV connector is electrically connected to the AV output connector 26, the RECORD/PLAYBACK MODE CHANGING SUBROUTINE changes, at predetermined intervals, the record/playback operating mode in the following order: erase mode; record normal monitor mode; record AV monitor mode; playback mode; and then back to the erase mode. With the still video camera of the present invention, the record mode is automatically switched to the playback mode when the AV connector is mated to the AV output connector 26. Similarly, the playback mode is automatically switched back to the record mode when the AV connector is disconnected from the AV output connector 26. Thus, the ease of operation of the camera is significantly improved over the prior art.

Furthermore, changing over to the record operating mode can also be achieved by operating the mode switch 18 when the AV connector is electrically connected to the AV output connector 26, so that a recording can be performed in accordance with an intended picture composition by monitoring the process in the record mode. In the case of a still video camera that does not have a monitoring mode, it is possible to eliminate the record/playback mode change-over switch 25, further reducing the size of the camera, while also simplifying its use.

When the AV connector is not electrically connected to the AV output connector 26, it is not possible to switch the camera to the playback mode by operating the mode switch 18. Though the present embodiment utilizes the connector mating detector switch 56 to check whether the AV input connector of the external apparatus is electrically connected to the AV output connector 26, other detection means may be employed, such as by employing a photocoupler or detecting the impedance of the attached external apparatus.

Figure 17:
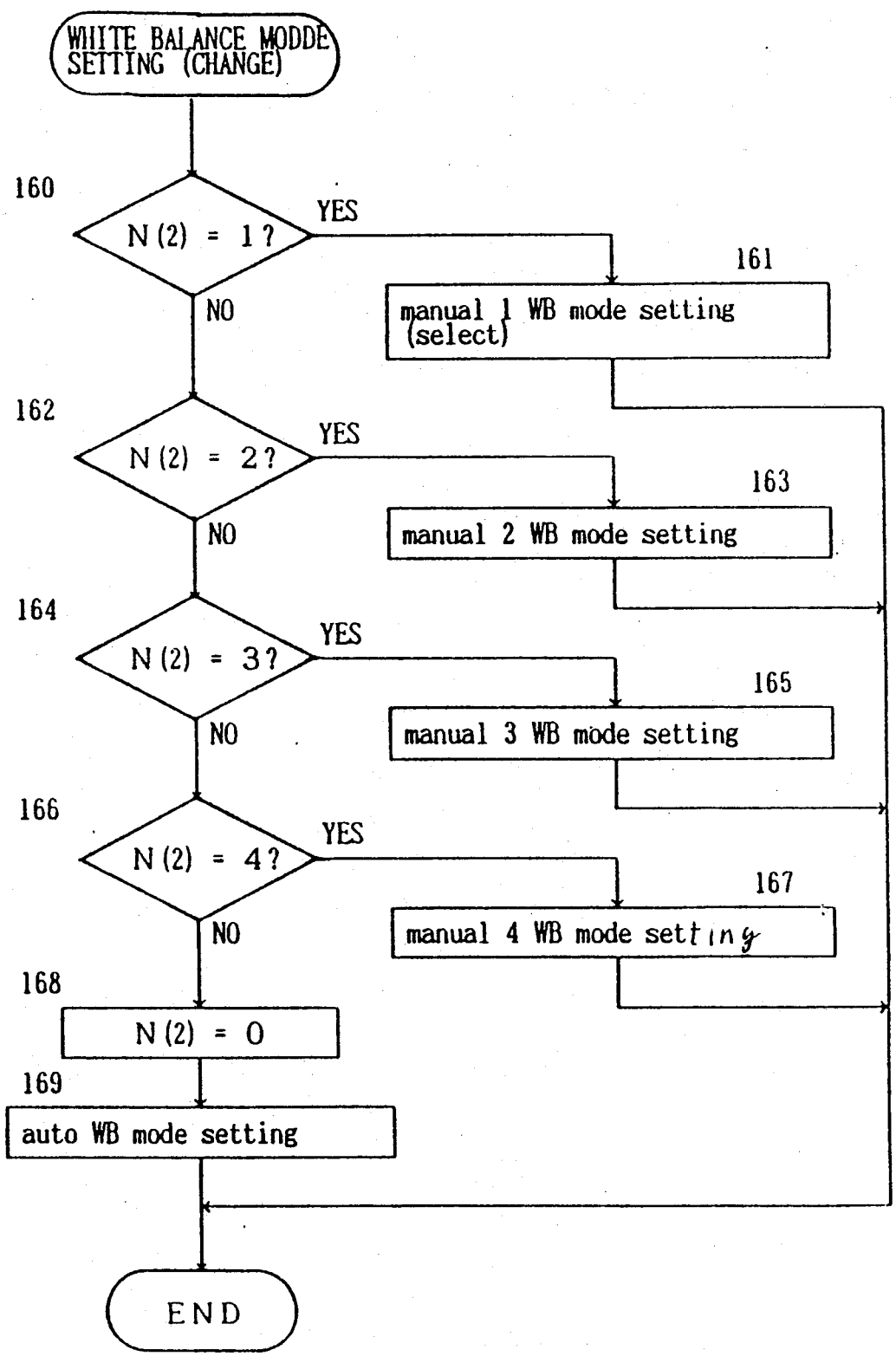
FIG. 17 is a flowchart illustrating the steps that are executed in performing a WHITE BALANCE MODE CHANGING SUBROUTINE.

The process that occurs when the mode switch 18 is depressed two times after the power switch 16 has been turned ON will now be described with reference to FIG. 17.

Mode Number M changes to 2 when the mode switch 18 is depressed two times. Thus, the processing at step 125 (FIG. 14(B)) proceeds to step 126 from which the WHITE BALANCE (WB) MODE CHANGING SUBROUTINE is executed.

In the WHITE BALANCE MODE CHANGING SUBROUTINE, step 160 checks whether select Number N(2) is 1, that is, whether the selector switch 19 has been depressed only once. If switch 19 has been depressed once, the subroutine proceeds to step 161, while if the determination is negative, the subroutine proceeds to step 162.

Figure 11B:

Step 161 sets the white balance mode to a first manual (cloudy weather) white balance mode and changes the display on the white balance display section of the LCD panel 15 to that shown in FIG. 11(B) before proceeding to the END process.

Step 162 checks whether select Number N(2) is 2, that is, whether the selector switch 19 has been depressed twice. If switch 19 has been depressed twice, the subroutine proceeds to a step 163. Otherwise, the subroutine proceeds to step 164.

Figure 11C:

Step 163 sets the white balance mode to a second manual (fine weather) white balance mode and changes the display on the white balance display section of the LCD panel 15 to that shown in FIG. 11(C) before proceeding to the END process.

Step 164 checks whether select Number N(2) is 3, that is, whether the selector switch 19 has been depressed three times. If it has been depressed three times, the subroutine proceeds to step 165. Otherwise, processing continues to step 166.

Figure 11D:

Step 165 sets the white balance mode to a third manual (fluorescent lamp) white balance mode and changes the display on the white balance display section of the LCD panel 15 to that shown in FIG. 11(D) before it performs the END process.

Step 166 checks whether select Number N(2) is 4, that is, whether the selector switch 19 has been depressed four times. If the determination is positive, step 167 is executed, while if the determination is negative, the subroutine proceeds to step 168.

Figure 11E:

Step 167 sets the white balance mode to a fourth manual (incandescent lamp) white balance mode and changes the display on the white balance display section of the LCD panel 15 to that shown in FIG. 11(E) before executing the END process.

Step 168 sets select Number N(2) to 0, resetting the counter. Step 120 increments select Number (N), from the initial value of 0, by 1 every time the selector switch 19 is turned ON. When select Number (N) reaches 5, step 168 resets it to 0. Thus, the value changes within a range from 0 to 4.

Step 169 sets the white balance mode to an automatic white balance mode and changes the display on the white balance display section to that shown in FIG. 11(A) before executing the END process.

In conclusion, the WHITE BALANCE MODE CHANGING SUBROUTINE cyclically changes the white balance mode, every time the selector switch 19 is depressed, in the following order: automatic white balance mode; cloudy weather white balance mode; fine weather white balance mode; fluorescent lamp white balance mode; incandescent lamp white balance mode; and back to the automatic white balance mode.

Figure 18:
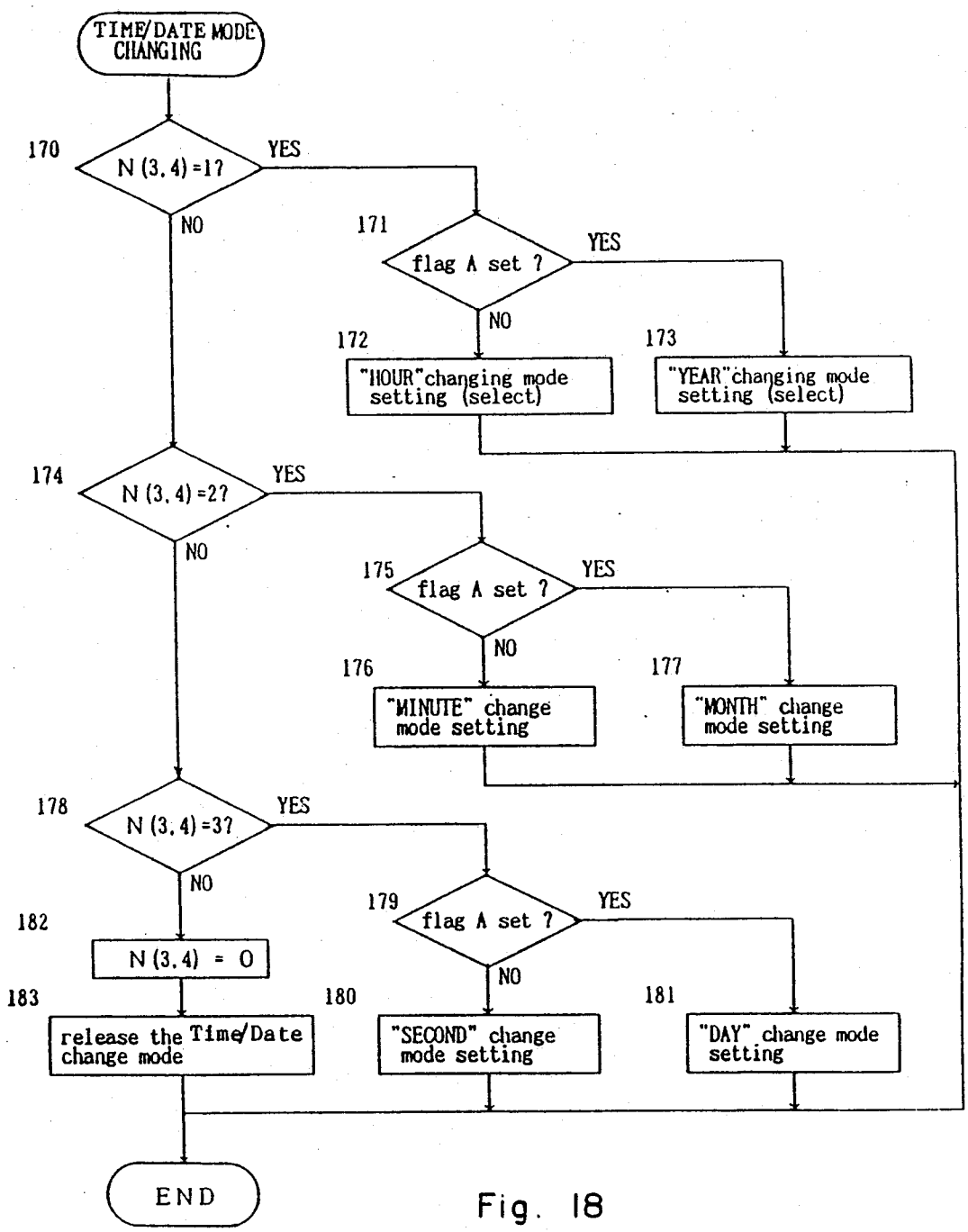
FIG. 18 is a flowchart illustrating the steps that are performed in executing a TIME/DATE CHANGING SUBROUTINE.

The process of the TIME/DATE MODE CHANGING SUBROUTINE, occurs when the mode switch 18 is depressed 3 or 4 times after the power switch 16 has been turned ON, will now be described with reference to FIG. 18.

Depressing the mode switch 18 three or four times changes mode Number M to 3 or 4. Therefore step 127 (FIG. 14(B)) proceeds to step 128, from which the TIME/DATE MODE CHANGING SUBROUTINE is entered.

In the TIME/DATE MODE CHANGING SUBROUTINE, step 170 checks whether select Number N (3) or N(4) is 1, that is, whether the selector switch 19 has been depressed once. If the determination is positive, the subroutine proceeds to step 171. Otherwise, the subroutine proceeds to step 174.

Step 171 checks whether flag A has been set. If it has not been set, the subroutine proceeds to step 172, wile if it has been set, the subroutine proceeds to step 173.

Step 172 executes the "hour" changing mode setting and changes the display on the time/date display section of the LCD panel 15 to that shown in FIG. 13(B). Thereafter, processing proceeds to the END process.

Step 173 executes the "year" changing mode setting and changes the display on the time/date display section of the LCD panel 15 to that shown in FIG. 12(B), before proceeding to the END process.

Step 174 checks whether select Number N(3) or N(4) is 2, that is, whether the selector switch 19 has been depressed twice. If it has been pressed twice, the subroutine proceeds to step 175. Otherwise, the subroutine proceeds to step 178.

Step 175 checks whether flag A has been set. If it has not been set, this indicates the minute change mode setting should be displayed (step 176). This changes the display on the time/date display section of the LCD panel 15 to that shown in FIG. 13(C). If the flag has been set, step 177 performs the month change mode setting display. This changes the display on the time/date display section of the LCD panel 15 to that shown in FIG. 12(C). After step 176 or step 177 is executed, processing proceeds to the END process.

Step 178 checks whether select Number N(3) or N(4) is 3, that is, whether the selector switch 19 has been depressed three times. If the determination is positive, the subroutine proceeds to step 179. If the determination is negative, the subroutine proceeds to step 182.

Step 179 checks whether flag A has been set. If it has not been set, the subroutine proceeds to step 180 to execute the second changing mode setting, which changes the display on the time/date display section of the LCD panel 15 to that shown in FIG. 13(D). If the flag has been set, the subroutine proceeds to step 181 to execute the day changing mode setting, which changes the display on the time/date display section of the LCD panel 15 to that shown in FIG. 12(D).

Step 182 resets select Number N(3) and N(4) to 0 and then proceeds to step 183. Select Number (N) is incremented by 1 every time the selector switch 19 is depressed. When select Number (N) reaches 4, step 182 operates to reset it to 0. Thus, select Number (N) changes within the range from 0 to 3.

Step 183 releases the time/date changing mode, stops flashing the time/date display section of the LCD panel 15, displays the data set by the mode setting process and then proceeds to the END process. Thus, the time/date changing mode is released after the selector switch 19 has been depressed four times.

The TIME/DATE CHANGING SUBROUTINE cyclically changes the flashing display (changing data), every time the selector switch 19 is turned ON, in the order of year—month—day—(setting)—year, if flag A has been set (i.e., the date display mode). In a similar manner, the flashing display (changing data) is cyclically changed every time the selector switch 19 is turned ON, in the order of hour—minute—second—(-setting)—hour, if flag A has been reset (i.e., the time display mode). The flashing date display is successively increased or decreased every time the up/down switch 17 is depressed while the time/date display section is flashing.

In the above-mentioned mode setting subroutines, when the release switch SWR is turned ON after the execution of the END process, if there is a flashing display, the flashing displayed mode or value is set and the display is switched from a flashing display to a fully on (illuminated) display.

The photographing mode can be changed merely by operating the selector switch 19. The other modes, (i.e., the record/playback mode, the white balance mode and the time/date mode) can be selected by operating the mode switch 18, and the mode or value can be changed by operating the selector switch 19. In addition, the mode is automatically switched over, for example, to the playback mode, the monitor mode, etc. upon the connection of the AV input connector to the AV output connector 26.

Figure 19:
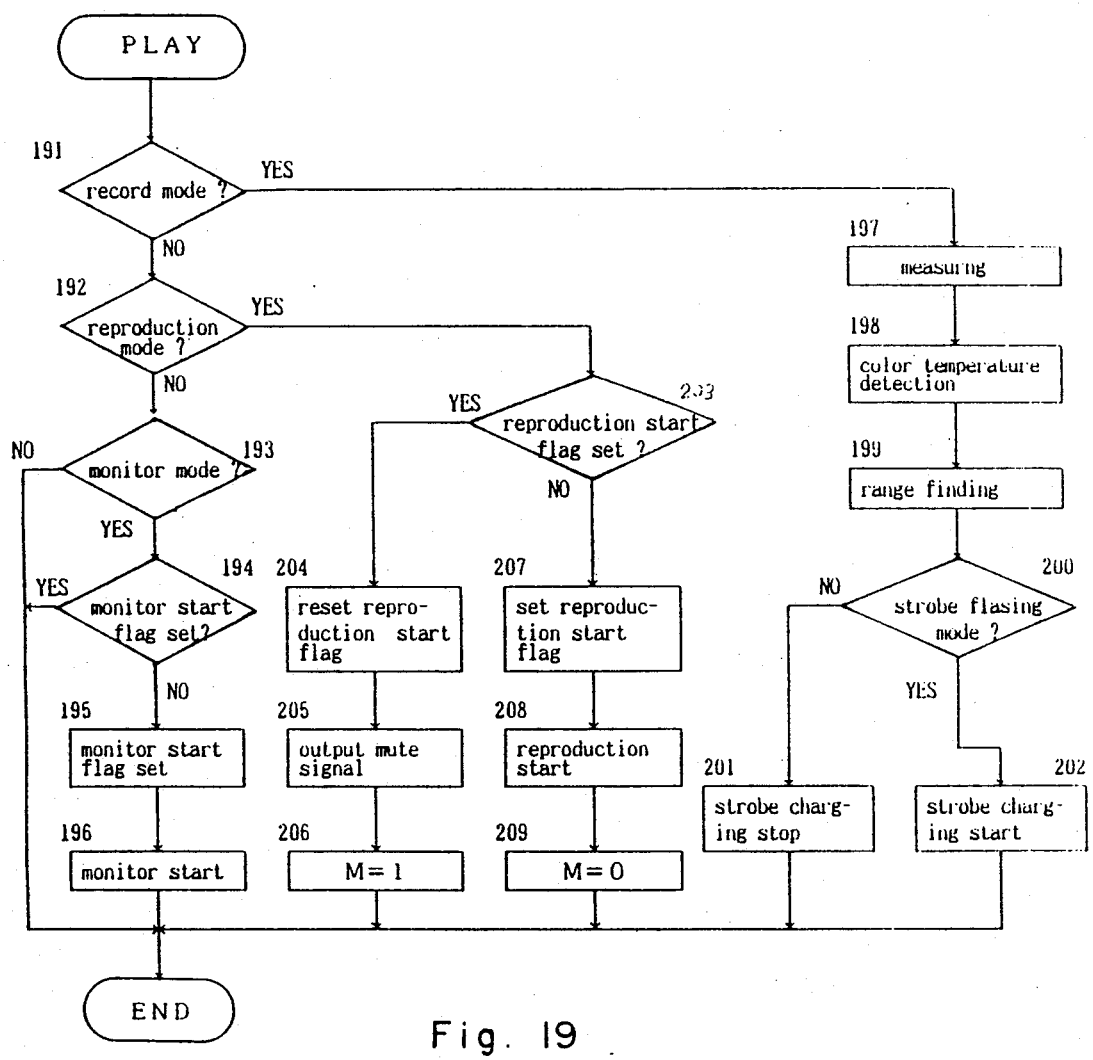
FIG. 19 is a flowchart illustrating the steps in executing a PLAYBACK MODE CHANGING SUBROUTINE.

The manner in which the system control circuit 33 operates when the AV input connector is electrically connected to the AV output connector 26 will now be discussed with reference to the flowchart shown in FIG. 19.

When the magnetic disc 37 is loaded into the camera body, the loading detector switch 42 is turned ON. Assuming the AV input connector is electrically connected to the AV output connector 26, the connector mating detector switch 56 will be turned ON. If the power switch 16 is already ON, the play switch SWP will be turned ON. Thus, a PLAY SUBROUTINE is executed.

In the PLAY SUBROUTINE, step 191 checks whether the current mode is the record mode. If it is not the record mode, the subroutine proceeds to step 192. Otherwise, the subroutine proceeds to step 197.

Step 192 checks whether the current mode is the playback mode. If the determination is negative, the subroutine proceeds to step 193. However, if the determination is positive, the subroutine proceeds to step 203.

Step 193 checks whether the current mode is the monitor mode. A negative determination results in the execution of the END process, while if the determination is positive, the subroutine proceeds to step 194.

Step 194 checks whether the monitor start flag has been set. If it has been set, this indicates that the monitor process has already been executed. Thus, the subroutine proceeds to the END process. However, if the flag has not been set, the subroutine proceeds to step 195 to set the monitor start flag, start the monitor operation (step 196) and perform the END process. The term "monitor" represents the mode in which the video signals outputted from the CCD image sensor 32 (and the audio signals that are outputted from a separate recorder device (not shown)) are outputted to the AV output connector 26.

As mentioned above, the subroutine proceeds from step 191 to step 197, if the current mode is the record mode. After step 197 has been performed, step 198 performs a color temperature detection and white balance value setting process. Thereafter, step 199 executes a range finding and focussing process. Afterwards, the subroutine proceeds to step 200.

In step 200, a determination is made as to whether the strobe flashing is ready. If it is determined that the strobe flashing is inhibited, the subroutine proceeds to step 201 to stop the charging of the strobe. If it is determined that the strobe flashing is ready, the subroutine proceeds to step 202 to initiate the charging of the strobe. When step 201 or step 202 has been performed, the subroutine proceeds to the END process.

If the END process has been reached in the record mode, the exposure/recording (photographing) process is executed by fully depressing the release button 20 so as to turn ON the release switch SWR.

If the camera is in the playback mode, the subroutine proceeds from step 192 to step 203, which checks whether the playback start flag has been set. If it is determined that the playback start flag has been set, the subroutine proceeds to step 204 to reset the playback start flag. Thereafter, the subroutine proceeds to step 205, which outputs a mute signal representing a stand-by condition.

After the mute signal is outputted, mode Number M is set to 1 (step 206). This causes the PLAY icon on the LCD panel 15 to flash, as shown in FIG. 9(A). Thereafter, the END process is executed.

If it is determined in step 203 that the playback mode start flag has not been set, the subroutine sets the playback start flag and executes the playback start process (steps 207 and 208). The magnetic head 36 accesses a predetermined track of the rotating magnetic disc 37 to retrieve signals recorded onto the accessed track. The retrieved signals are outputted to the AV connector 26. Then, mode Number M is set to 0 (step 209), which illuminates the PLAY icon on the LCD panel 15, as shown in FIG. 9(B), before proceeding to the END process.

With a still video camera constructed as described above, the stand-by condition is established when the playback mode is selected but the release button 20 has not been depressed. This feature reduces the possibility of the battery power being needlessly used. Additionally, the mute signals are outputted in the stand-by condition, so that no picture "roughness" is apparent on a viewing device (i.e., a monitor) due to the generation white noise signals, when, for example, the playback track is shifted during the standby period.

Furthermore, the release button 20 (play switch SWP) also serves as the switch for starting and stopping the playback operation when the camera is in the playback mode. Thus, it is unnecessary to provide a separate switch that would be exclusively used for such a purpose. In addition, the starting and stopping of the playback operation is effected upon each depression of the release button 20. Therefore, a separate stop switch is not required, permitting the camera to be made smaller and with fewer controls. Although the starting and stopping of the playback operation is described herein as being controlled under the operation of the play switch SWP (which is adapted to be activated by depressing the release button 20 halfway), an arrangement may be adopted wherein the starting and stopping of the playback operation is controlled by the release switch SWR, which is adapted to be activated by fully depressing the release button 20. The status of the playback operation is visually displayed by flashing the PLAY icon on the record/playback display section of the LCD panel 15 when it is in the stand-by condition, or fully illuminating the PLAY icon when the playback operation is in progress. Therefore, the photographer is always informed of the current operation of the camera.

Figure 20:
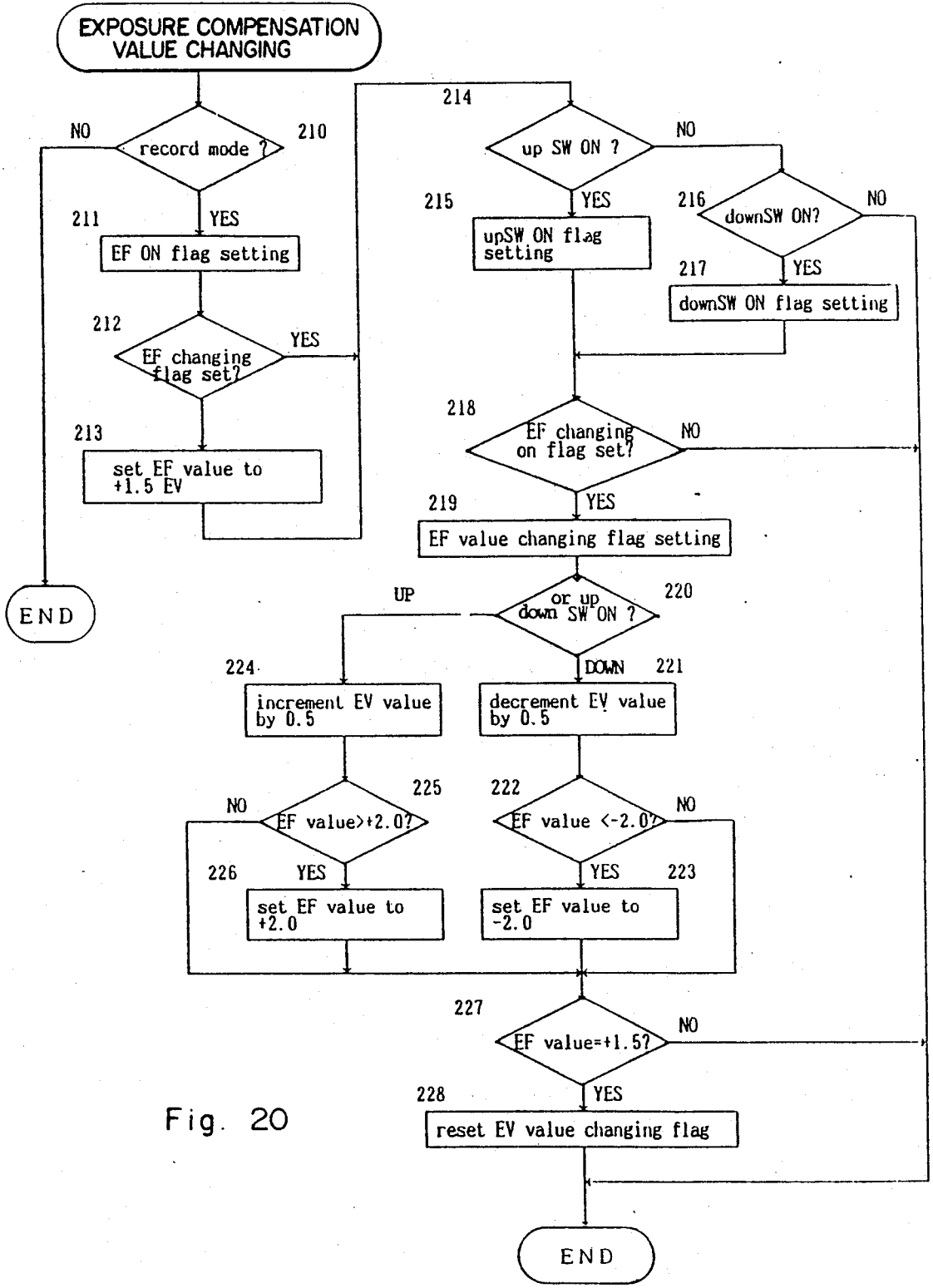
FIG. 20 is a flowchart illustrating the steps that are executed in performing an EXPOSURE COMPENSATION VALUE CHANGING SUBROUTINE.

The EXPOSURE COMPENSATION VALUE CHANGING MODE SUBROUTINE will now be described with reference to the flowchart of FIG. 20.

When the exposure compensation switch 22 is turned ON, the EXPOSURE COMPENSATION VALUE SETTING SUBROUTINE is entered. In this subroutine, step 210 checks whether the current mode is the record mode. If the determination is positive, the subroutine proceeds to step 211, while if the determination is negative, the subroutine proceeds to the END process.

Step 211 sets an exposure compensation (EF) ON flag, indicating that the exposure compensation is in progress. This assures that the exposure value will be compensated at the time of the exposure operation.

Thereafter, step 212 determines whether the exposure compensation value changing flag has been set, that is, whether the exposure compensation value differs from the reference value of +1.5 EV. If the determination is positive, the subroutine jumps to step 214.

If determination in step 212 is negative, the subroutine proceeds to step 213 to set the exposure compensation value to +1.5 EV. Then, the process continues at step 214.

Step 214 checks whether the up-switch 17a has been turned ON. If it has been turned ON, an up-switch ON flag is set in step 215, before going to step 218.

If the result of the test made in step 214 is negative, the subroutine proceeds to step 216 to check whether the down-switch 17b has been turned ON. If the down-switch 17b is OFF, the subroutine proceeds to the END process. However, if this test result is positive, the subroutine proceeds to step 217 to set a down-switch ON flag, before proceeding to step 218.

Step 218 checks whether an exposure compensation value changing flag has been set. If it is not set, the END process is performed. However, if it has been set, the subroutine proceeds to a step 219, so as to set the exposure compensation value changing flag. Upon the setting of this exposure compensation value changing flag, the exposure compensation value changing display ±EF icon is lit, as shown in FIGS. 5(C) to 5(E).

Then, the subroutine checks executes step 220, which checks whether the up-switch ON flag has been set (i.e., whether the up-switch 17a has been turned ON) or the down-switch ON flag has been set (i.e., whether the down-switch 17b has been turned ON). If it is determined that the down-switch ON flag has been set, the subroutine proceeds to step 221. If it is determined that the up-switch ON flag has been set, the subroutine proceeds to step 224.

Step 221 reduces the exposure compensation value by a 0.5 EV increment and proceeds to step 222 to check whether the exposure compensation value is less than −2.0 EV. If it is less than −2.0 EV, the subroutine proceeds to step 223 to set the exposure compensation value to −2.0 EV, before proceeding to step 227. Thus, the minimum EV value of the exposure compensation value is specified as −2.0 in this embodiment. If the exposure compensation value is not less than −2.0 EV, the subroutine proceeds to step 227.

If the test performed in step 220 indicates that the up-switch 17a is ON, the subroutine jumps from step 220 to step 224, which increases the exposure compensation value by a +0.5 EV before proceeding to step 225, which checks whether the exposure compensation value is +2.0 EV or higher. If a positive determination is obtained, step 226 sets the exposure compensation value to +2.0 EV and then proceeds to a step 227. If a negative determination is obtained, step 226 is skipped. Thus, the maximum EV value of the exposure compensation value is specified as +2.0 EV in this embodiment.

Step 227 checks whether the exposure compensation value is equal to +1.5 EV (i.e., the reference value). If it is equal to +1.5 EV, the subroutine proceeds to step 228, which resets the exposure compensation value changing flag before performing the END process. If the exposure compensation value is not equal to +1.5 EV, the subroutine jumps directly to the END process, skipping step 228. In this manner, if the exposure compensation value is equal to the reference value, the exposure compensation value changing display ±EF icon on the LCD panel 15 is not displayed. If, on the other hand, the exposure compensation value differs from the reference value, the exposure compensation value changing display ±EF on the LCD panel 15 is lit.

This subroutine is repeatedly executed at predetermined intervals so long as the exposure compensation switch 22 remains turned ON.

With the embodiment arranged as described above, the exposure compensation value changing operation is simplified, because the exposure compensation value is changed by merely depressing the up-down switch 17 while the exposure compensation switch 21 is depressed. In addition, the total number of switches on the camera is reduced, because the up-down switch 17 also serves as the exposure compensation changing means. Moreover, after the exposure compensation value has been changed from the reference value of +1.5 EV, the display ±EF icon on the track number/exposure compensation display section of the LCD panel 15 is lit up, even when the exposure compensation switch 21 is not depressed, so that the user can know in advance that the exposure compensation value has been changed from the reference value.

Although, in this embodiment, the reference value of exposure compensation is specified as +1.5 EV, which is most often used in a backlight shot, and the exposure compensation value is incremented or decremented in 0.5 EV steps Within the range of plus or minus 2.0 EV, the present invention is not limited to these values.

With the mode setting device for a camera constructed as described above, the photographing mode which is most frequently switched can be changed by merely operating the selector switch 19 in its initial state, for example, after the power switch 16 has been turned ON, after the release button 20 has been operated, after the AV connector has been disconnected from the AV output connector 26 or before the other operations are performed. Such a feature is advantageous in that the mode changing is simplified, the operability of the camera is substantially improved and any erroneous mode change is avoided. Once the mode changing has been made, the current mode is set by depressing the release button 20, obviating the need for a separately provided operating member that would be used exclusively used for this purpose. Such a feature permits the construction of a compact camera that is low in cost.

In summary, the present invention provides a camera in which a mode changing operation can be achieved using a single operating member (the selector switch 19) for the most frequently changed mode function (i.e., the photographing mode) or in which the mode changing may be achieved by manipulating a combination of several operating members (i.e., the up-down switch 17, the mode switch 18 and the selector switch 19) to change less frequently used mode functions.

With the present embodiment, the date display and the time display on the time/date display section of the LCD panel 15 are alternately and cyclically changed by operating the mode switch 18. Data adjustment for each display can be performed by operating the up-down switch 17, which is primarily used to control the tracking of the magnetic head 36. Consequently, the number of operating switches needed are reduced, permitting the construction of a lower cost compact camera that is easy to use.

The unique arrangement in which the date and time are displayed on the LCD panel 15 that are common to the various mode display sections, such as the photographing mode display section, is very convenient in that the time and date are known, together with the various modes which have been set, at a glance. Although the present invention has been illustrated and described with reference to an electronic still video camera, the present invention is also applicable to conventional type camera that utilize silver halide film for recording an image.

What is claimed is:

1. A mode changing device for a still video camera, comprising:
   means for setting a mode from a plurality of function modes in which an operation of said camera is controlled and a plurality of modes associated with each of said function modes;
   means for displaying said plurality of function modes;
   mode changing means for selecting a function mode from said plurality of function modes displayed on said display means which has been selected for changing;
   mode changing actuator means for actuating said mode changing means through an external operation; and
   means for selecting a mode from said plurality of modes associated with each function mode selected for being changed by said mode changing means, wherein said display mode of said selected mode is selected by said mode changing actuator means.

2. A mode changing device for a camera having a time/date function, comprising:
   means for selectively setting a mode from a plurality of function modes in which the operation of said camera is controlled and a plurality of modes associated with each of said function modes;
   means for displaying said plurality of function modes;
   mode changing means for selecting a function mode from said plurality of function modes displayed on said display means which has been selected for changing;
   mode changing actuator means to actuate said mode changing means through an external operation;
   means for selectively displaying a time mode and a date mode; and
   means for selecting a mode from said plurality of modes associated with each function mode selected for being changed by said mode changing means, wherein said display mode of said time/date function is selected by said mode changing actuator means.

3. A time/date device for a photographic camera as recited in claim 2, wherein said mode changing means cycles through said data display mode or said time display mode in a predetermined order when said mode actuator means in operated, for selectively preparing said modes to be changed, said display means switching between said date display mode and said time display mode for every complete cycle.

4. A time/date device for a photographic camera as recited in claim 3, wherein said mode changing means alternately selects said date display mode or said time display mode, through the operation of said mode changing actuator means, as long as a main switch, which operates to supply electrical power to portions of said camera, is in an inactive state.

5. An exposure compensating mode changing device for a camera, comprising:
 a still video camera;
 means for calculating an exposure value;
 means for automatically setting an exposure on the basis of said exposure value provided by said exposure value calculating means;
 means for compensating said set exposure so as to activate said automatic exposure means on the basis of a compensated exposure value;
 means for activating said exposure compensating means;
 means for changing said exposure compensation value;
 means for actuating said exposure compensation value changing means, said exposure compensation value changing actuator means also operating as a tracking adjustment actuator means when said exposure compensating means is in an inactive state; and
 an indicator for displaying said exposure compensation value and a track number, said indicator displaying said exposure compensation value when said exposure compensation actuator means is in an active state, while displaying said track number when said exposure compensation actuator means is in said inactive state.

6. An exposure compensating device as recited in claim 5, wherein a change in said exposure compensation value is displayed on said indicator when said exposure compensation value has been changed with respect to a reference value.

7. A still video camera, comprising:
 means for generating video signals of an image corresponding to an object to be photographed;
 means for recording said video signals onto a recording medium;
 means for reproducing said video signals recorded onto said recording medium;
 means for outputting said reproduced video signals to an external apparatus; and
 means for automatically switching said camera from a recording mode to a reproducing mode when a means for connecting said external apparatus is electrically connected to said outputting means of said camera, said automatic switching means automatically switching said camera back to said recording mode when said connection means is electrically disconnected from said outputting means of said camera, said automatic switching means being prevented from switching said camera from said recording mode to said reproducing mode when an external actuator means is operated and said connection means is not electrically connected to said outputting means of said camera.

8. A still video camera as recited in claim 7, wherein said automatic switching means switches said camera to said recording mode by operating said external actuator means when said connection means is electrically connected to said outputting means.

9. A still video camera as recited in claim 7, wherein said video signals are recorded by said recording means onto said recording medium and are also outputted by said reproducing means to said outputting means when said connection means is electrically connected to said outputting means.

10. A still video camera as recited in claim 11, 6 wherein said video signals recorded onto said recording medium can be erased even if said connection means is electrically connected to said output means.

11. A still video camera, comprising:
 means for recording video signals onto a recording medium;
 means for reproducing said recorded video signals;
 means for selectively changing an operating mode of said camera to a record mode, in which said recording means is activated, and a reproduction mode, in which said reproducing means is activated; and
 an initiator switch that activates said reproducing means and said recording means, wherein said reproducing means starts reproducing said recorded video signals when said initiator switch is activated and said reproduction mode has been selected, while initiating said recording of said video signals onto said recording medium when said record mode has been selected.

12. A still video camera as recited in claim 11, wherein said reproducing means does not reproduce said reproduced video signals when said initiator switch does not activate said reproducing means.

13. A still video camera as recited in claim 11, wherein said reproducing means is alternately started and stopped every time said initiator switch is activated and deactivated when said camera is in said reproducing mode.

14. A still video camera as recited in claim 11, further comprising means for monitoring the output of said recorded signal that is inputted to an external connection means, said monitoring means being operatively associated with said initiator switch to start and stop said reproduction means.

15. A still video camera, comprising:
 means for generating video signals of an image corresponding to an object to be photographed;
 means for recording said video signals onto a recording medium;
 means for reproducing said video signals recorded onto said recording medium;
 means for outputting said reproduced video signals to an external apparatus;
 means for automatically switching said camera from a recording mode to a reproducing mode when a means for connecting said external apparatus to said camera is electrically connected to said outputting means of said camera, said automatic switching means switching said camera to said recording mode, activating said recording means when said connection means is electrically disconnected from said outputting means;
 external actuator means for automatically switching said camera to said reproduced video signal outputting means when said external apparatus is electrically connected to said outputting means, mode changing means for selecting a function mode from a plurality of function modes that are displayed on an indicator and which has been selected for changing; and selector means for selecting a mode from said plurality of modes associated with each function selected for being changed by said mode changing means, said mode changing means being adapted to, in an initial state, prepare a photographing mode setting means to be changed through the operation of said selector means and then actually change said mode through the operation of said selector means.

16. The still video camera of claim 15, wherein said indicator displays a date and a time.

17. The still video camera of claim 16, wherein said mode changing means alternately selects a display of said date or a display of said time, through the operation of a mode changing actuator means, as long as a main switch, which operates to supply electrical power to portions of said camera, is in an inactive state.

18. The still video camera of claim 15, wherein said plurality of modes include a record/reproducing/erasing mode, an exposure mode, a copy/monitor mode, a strobe operation mode, a white balance mode, a photographic frame mode and a time/date mode.

19. The still video camera of claim 15, further comprising means for compensating an exposure value of said camera.

20. The still video camera of claim 19, when said exposure compensating means comprises:
   means for calculating said exposure value;
   means for automatically setting an exposure on the basis of said exposure value provided by said exposure value calculating means;
   means for compensating said set exposure so as to activate an automatic exposure means on the basis of a compensated exposure value;
   means for activating said exposure compensating means;
   means for changing said exposure compensation value; and
   means for actuating said exposure compensation value changing means.

21. The still video camera of claim 16, further comprising:
   means for calculating an exposure value;
   means for automatically setting an exposure on the basis of said exposure value provided by said exposure value calculating means;
   means for compensating said set exposure so as to activate an automatic exposure means on the basis of a compensated exposure value;
   means for activating said exposure compensating means;
   means for changing said exposure compensation value; and
   means for actuating said exposure compensation value changing means.

22. A still video camera, comprising:
   means for generating video signals of an image corresponding to an object to be photographed;
   means for recording said video signals onto a recording medium;
   means for reproducing said video signals recorded onto said recording medium; means for outputting said reproduced video signals to an external apparatus;
   means for automatically switching from a recording mode to a reproducing mode when means for connecting said external apparatus to said camera is electrically connected to said outputting means of said camera, said automatic switching means switching to said recording mode by an external actuator means, said switching means switching to said recording mode, activating said recording means when said connection means is electrically disconnected from said outputting means of said camera;
   means for preventing said switching means from switching the operating mode of said camera to said reproducing mode when said external actuator means is operated if said connection means is not electrically connected to said output means of said camera;
   mode changing means for selecting a function mode from a plurality of function modes that are displayed on an indicator and which has been selected for changing; and
   selector means for selecting a mode from said plurality of modes associated with each function selected for being changed by said mode changing means, said mode changing means being adapted to, in an initial state, prepare a photographing mode setting means to be changed through the operation of said selector means and then actually change said mode through the operation of said selector means.

23. The still video camera of claim 22, wherein said camera includes a plurality of operating modes that are controllable by a mode changing device.

24. The still video camera of claim 23, wherein said mode changing device comprises:
   means for selecting a function mode to be changed;
   means for selecting an operating mode from a plurality of operating modes associated with said function mode that was selected to be changed; and
   means for setting a desired operating mode from said plurality of operating modes for said selected function mode.

25. A still video camera, comprising:
   means for generating video signals of an image corresponding to an object to be photographed;
   means for recording said video signals onto a recording medium;
   means for reproducing said video signals recorded onto said recording medium;
   means for outputting said reproduced video signals to an external apparatus;
   means for automatically switching from a recording mode to a reproducing mode when means for connecting said external apparatus to said camera is electrically connected to said outputting means of said camera, said automatic switching means switching to said recording mode by an external actuator means, said switching means switching to said recording mode, activating said recording means when said connection means is electrically disconnected from said outputting means of said camera;
   means for simultaneously outputting said recorded video signals through said reproducing means as said video signals are being recorded onto said magnetic medium when said connection means is electrically connected to said output means of said camera;
   mode changing means for selecting a function mode from a plurality of function modes that are displayed on an indicator and which has been selected for changing; and
   selector means for selecting a mode from said plurality of modes associated with each function selected for being changed by said mode changing means, said mode changing means being adapted to, in an initial state, prepare a photographing mode setting means to be changed through the operation of said selector means and then actually change said mode through the operating of said selector means.

26. A camera, comprising:
a mode changing device, having:
- means for selectively setting a mode from a plurality of function modes in which an operation of said camera is controlled and a plurality of modes associated with each of said function modes;
- means for displaying said plurality of function modes;
- mode changing means for selecting a function mode from said plurality of function modes displayed on said display means which has been selected for changing;
- mode changing actuator means for actuating said mode changing means through an external operation;
- means for selectively displaying a time mode and a date mode; and
- means for selecting a mode from said plurality of modes associated with each function mode selected for being changed by said mode changing means, wherein said display mode of said time/date function is selected by said mode changing actuator means; and a still video recording/reproducing unit, having:
- means for generating video signals of an image corresponding to an object to be photographed;
- means for recording said video signals onto a recording medium;
- means for reproducing said video signals recorded onto said recording medium;
- means for outputting said reproduced video signals to an external apparatus;
- means for automatically switching between a recording mode and a reproducing mode, said automatic switching means switching to said reproducing mode, activating said reproducing means when means for connecting said external apparatus to said camera is electrically connected to said outputting means of said camera, said automatic switching means switching to said recording mode by an external actuator means, said automatic switching means switching to said recording mode, activating said recording means when said connection means is electrically disconnected from said outputting means of said camera; and
- means for simultaneously outputting said recorded video signals through said reproducing means as said video signals are being recorded onto said magnetic medium when said connection means is electrically connected to said output means of said camera.

27. The still video camera of claim 26, wherein one function mode comprises a white balance adjusting function.

28. The still video camera of claim 26, wherein one function mode comprises an exposure compensation function.

29. The still video camera of claim 26, wherein said plurality of function modes includes a time/date function and an exposure compensation function.

30. A camera, comprising:
means for obtaining an image of an object to be recorded;
means for recording said image onto a recording medium;
means for reproducing said recorded image;
means for selecting a mode from a plurality of function modes in which an operation of said camera is controlled and a plurality of modes associated with each of said function modes;
means for displaying said plurality of function modes, said display means selectively indicating a time mode and a date mode;
means for setting a desired function mode from said plurality of function modes displayed on said display means which has been selected for changing;
means for changing a function mode from said plurality of function modes displayed on said display means which has been selected for changing;
means for actuating said desired function mode setting means through an external operation; and
means for selecting a mode from said plurality of modes associated with each function mode selected for being changed by said mode changing means, wherein said time mode and date mode are selected by said actuating means.

31. The camera of claim 30, wherein said display means selectively displays said operating modes and said function modes of said camera.

32. The camera of claim 31, wherein said mode selecting means comprises a switch that cycles through said plurality of function modes that are available to be changed when said switch is activated.

33. The camera of claim 32, wherein said function mode setting means comprises a switch that cycles through said plurality of function modes for said selected function mode.

34. The camera of claim 30, further including means for automatically switching said camera to a reproducing mode, activating said reproducing means when a means for connecting an external apparatus to said camera is electrically connected to an output means of said camera, said automatic switching means switching to said recording mode, activating said recording means when said connection means is electrically disconnected from said output means of said camera.

35. The camera of claim 31, further including means for automatically switching said camera to a reproducing mode, activating said reproducing means when a means for connecting an external apparatus to said camera is electrically connected to an output means of said camera, said automatic switching means switching to said recording mode, activating said recording means when said connection means is electrically disconnected from said output means of said camera.

36. The camera of claim 35, wherein said automatic switching means is prevented from switching said camera to said reproducing mode when an external actuator means is operated if said connection means is not electrically connected to said output means of said camera.

37. The camera of claim 34, wherein said automatic switching means switches said camera to said record mode by operating an external actuator means when said connection means is electrically connected to said output means of said camera.

38. The camera of claim 37, wherein said automatic switching means is prevented from switching said camera to said reproducing mode when an external actuator means is operated if said connection means is not electrically connected to said output means of said camera.

* * * * *